Nov. 18, 1947.  R. WILDERMANN  2,431,290
CONTROL GEARING AND LEVER
Filed Aug. 13, 1942  9 Sheets-Sheet 5
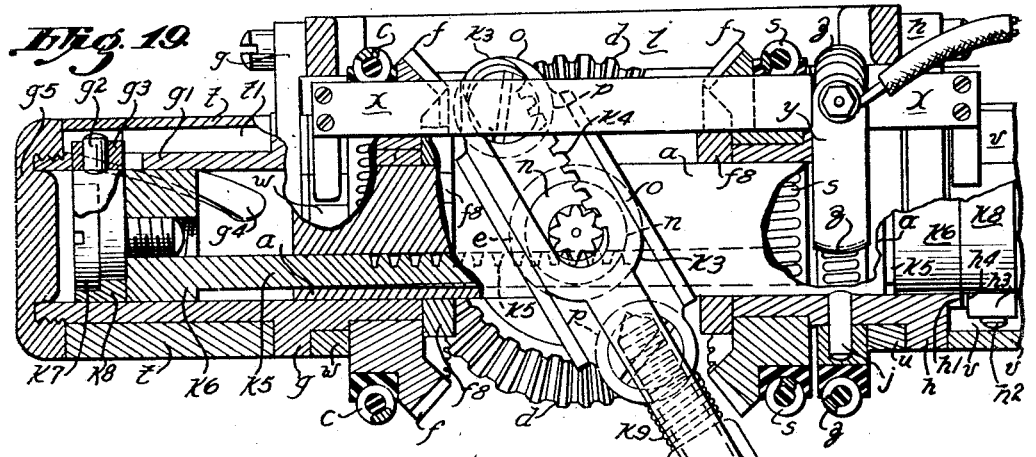
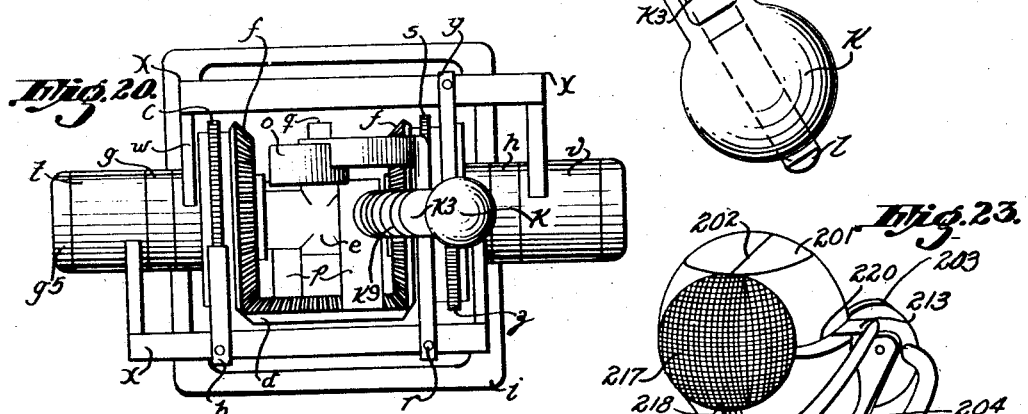
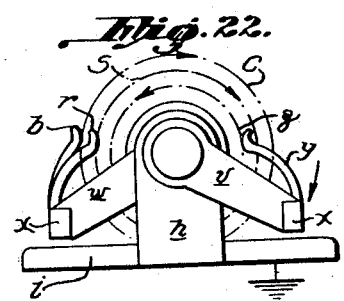
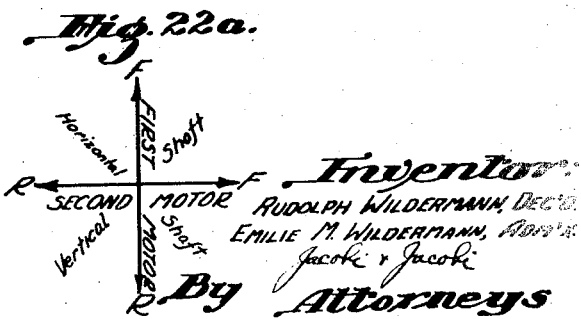

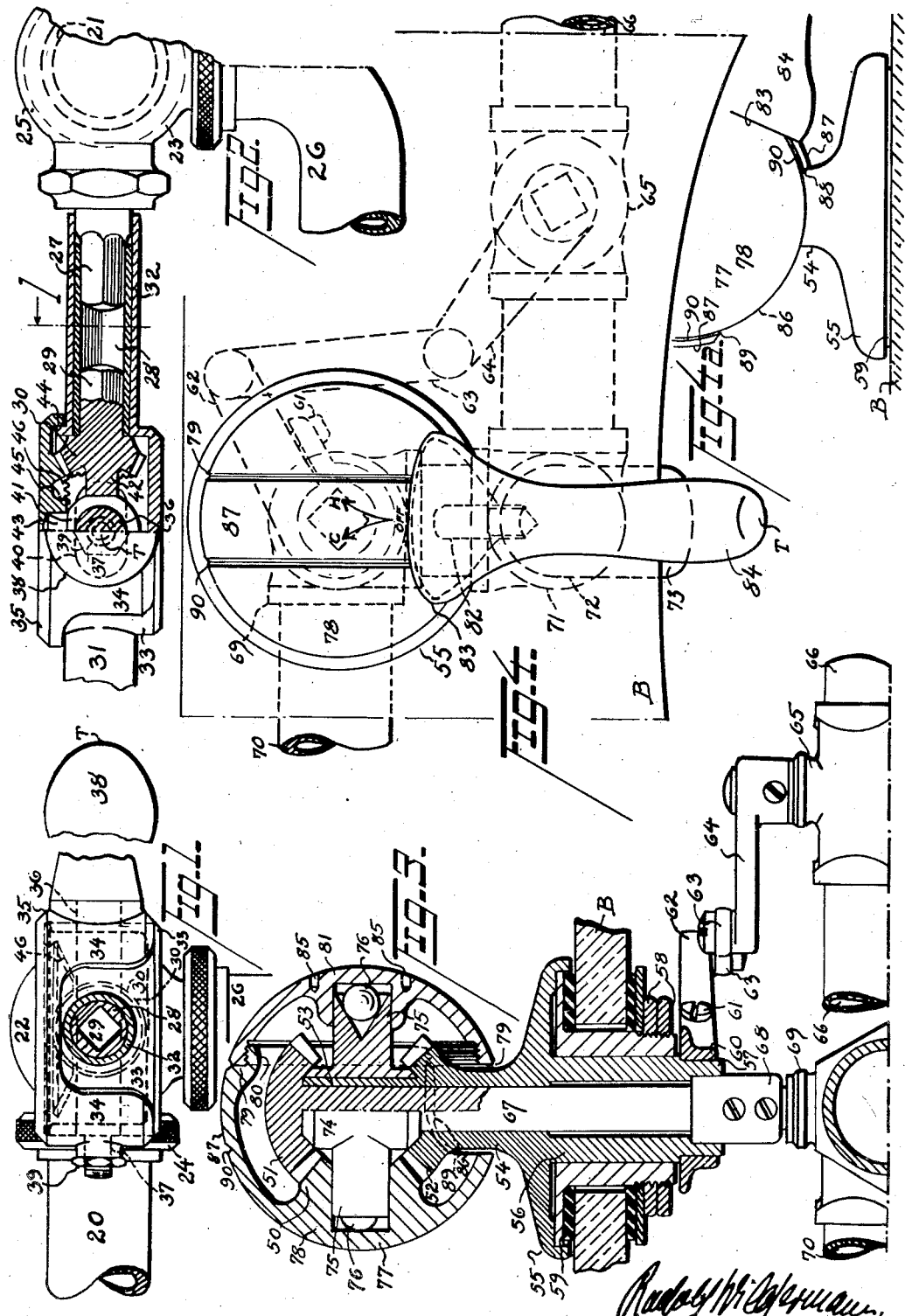

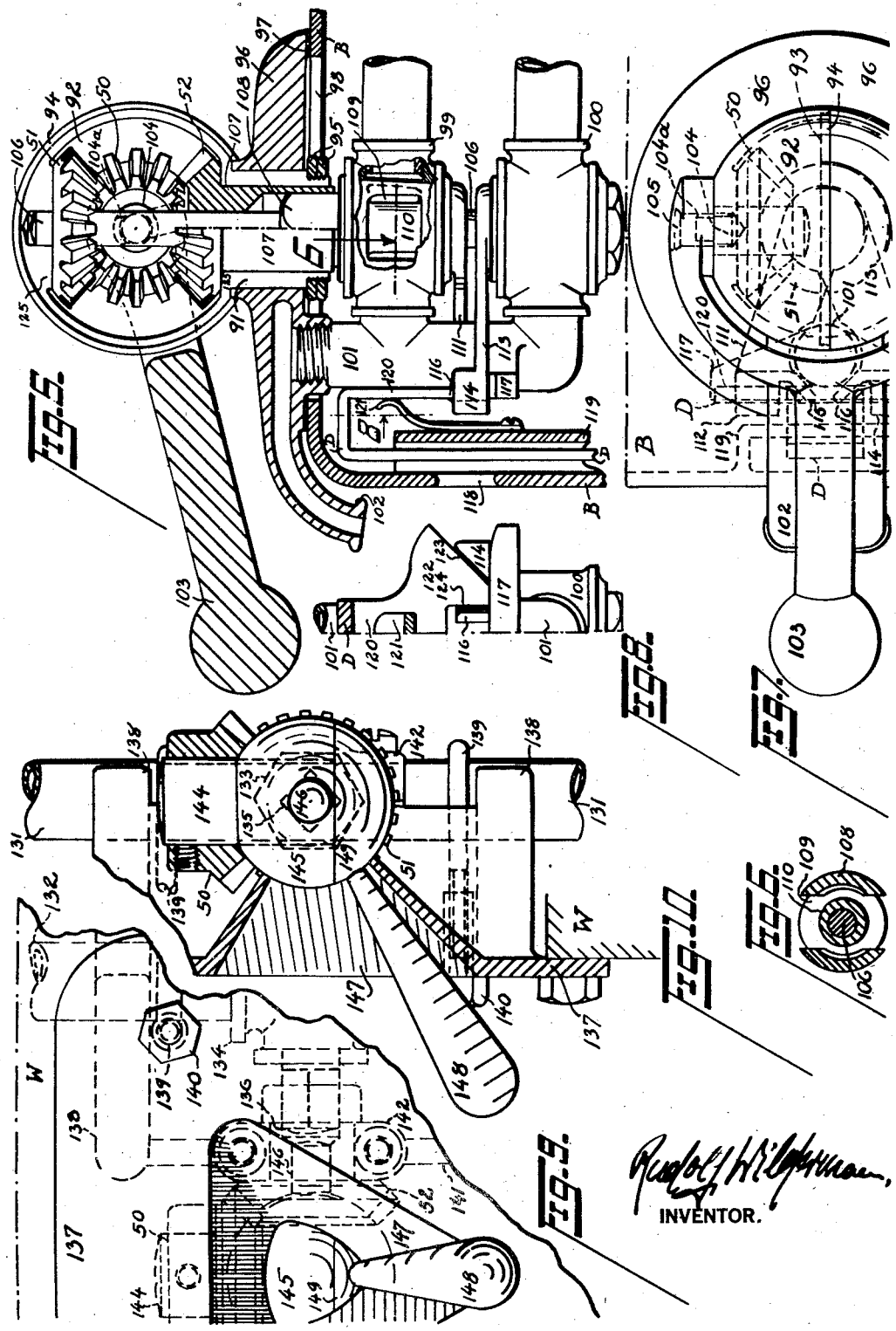

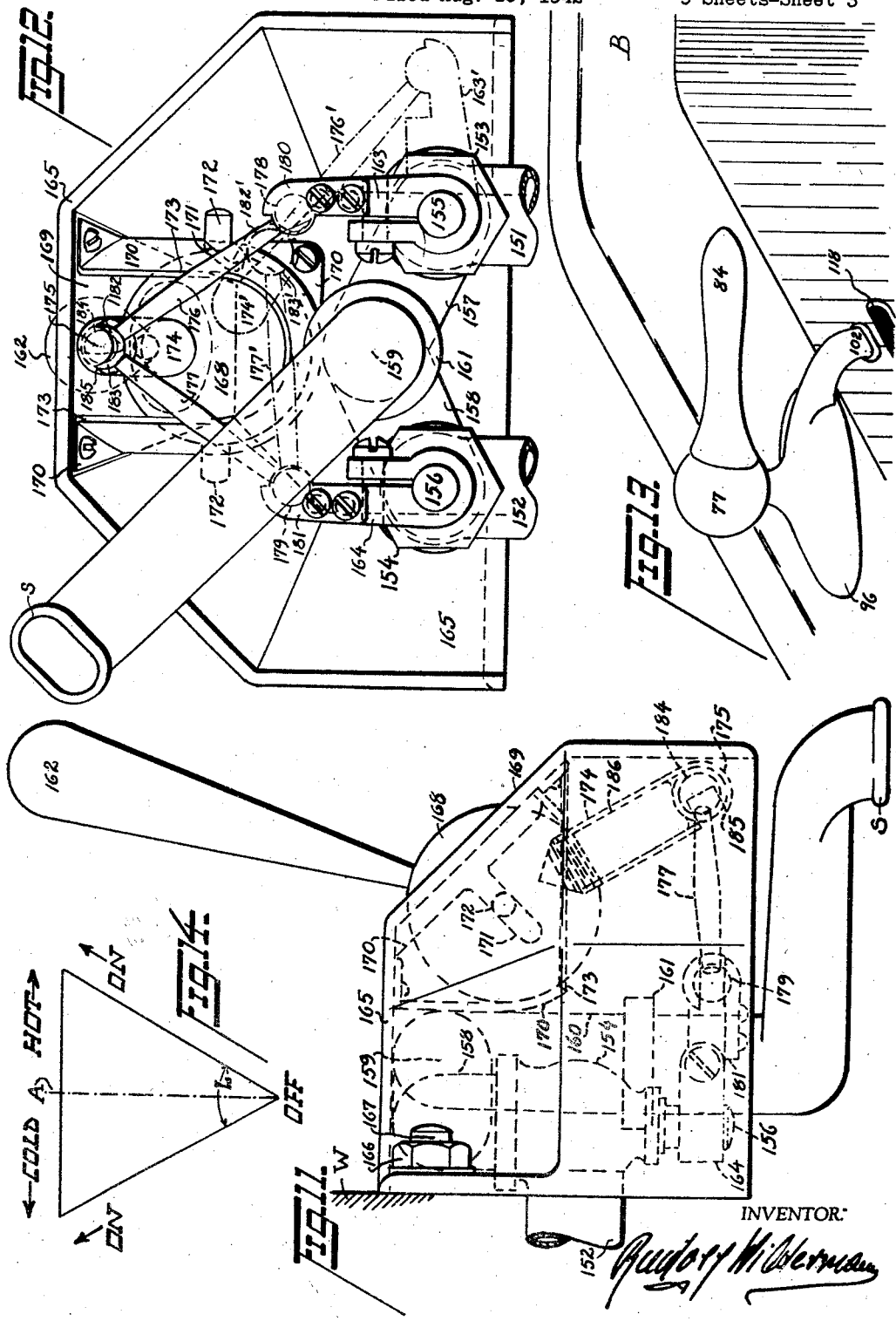

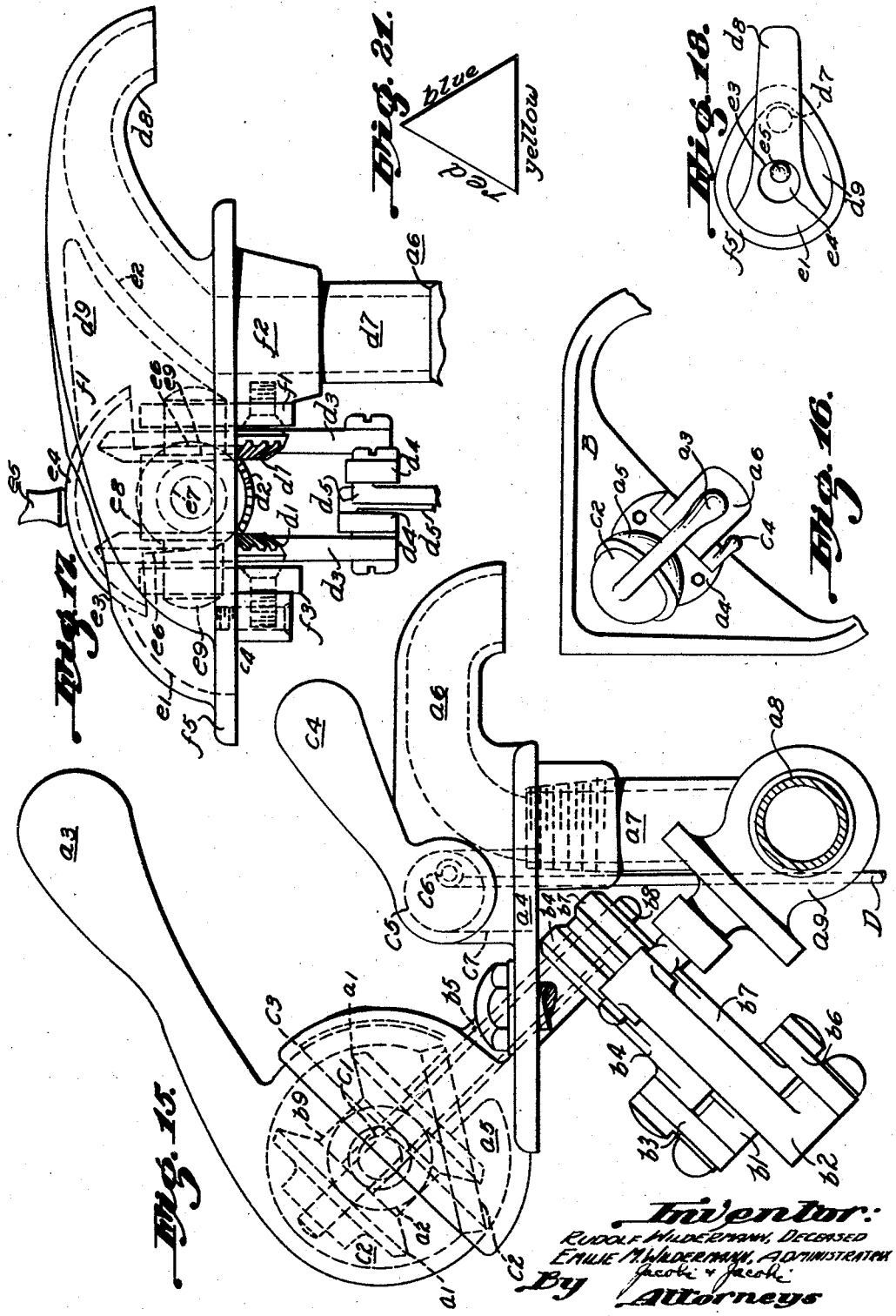

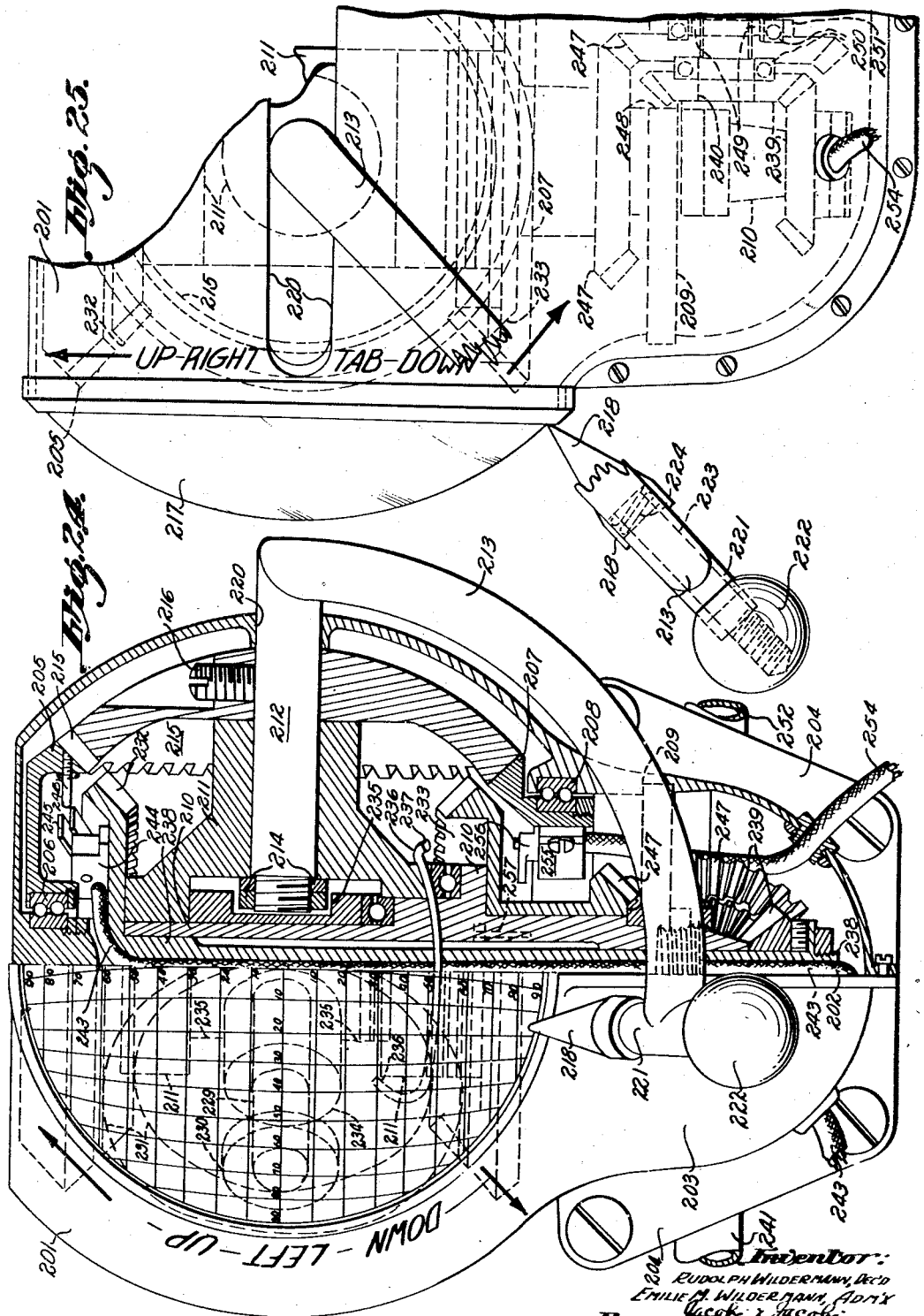

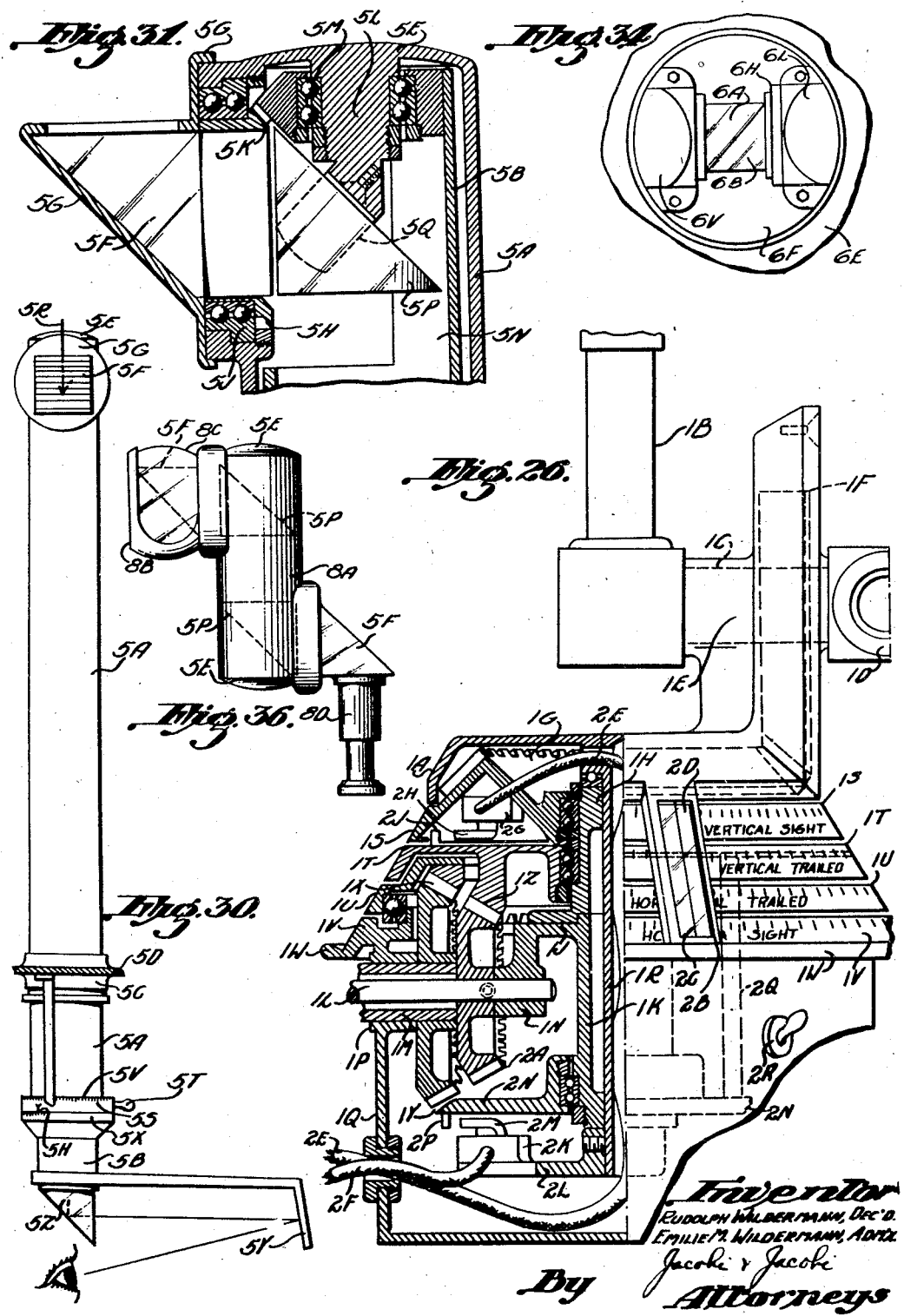

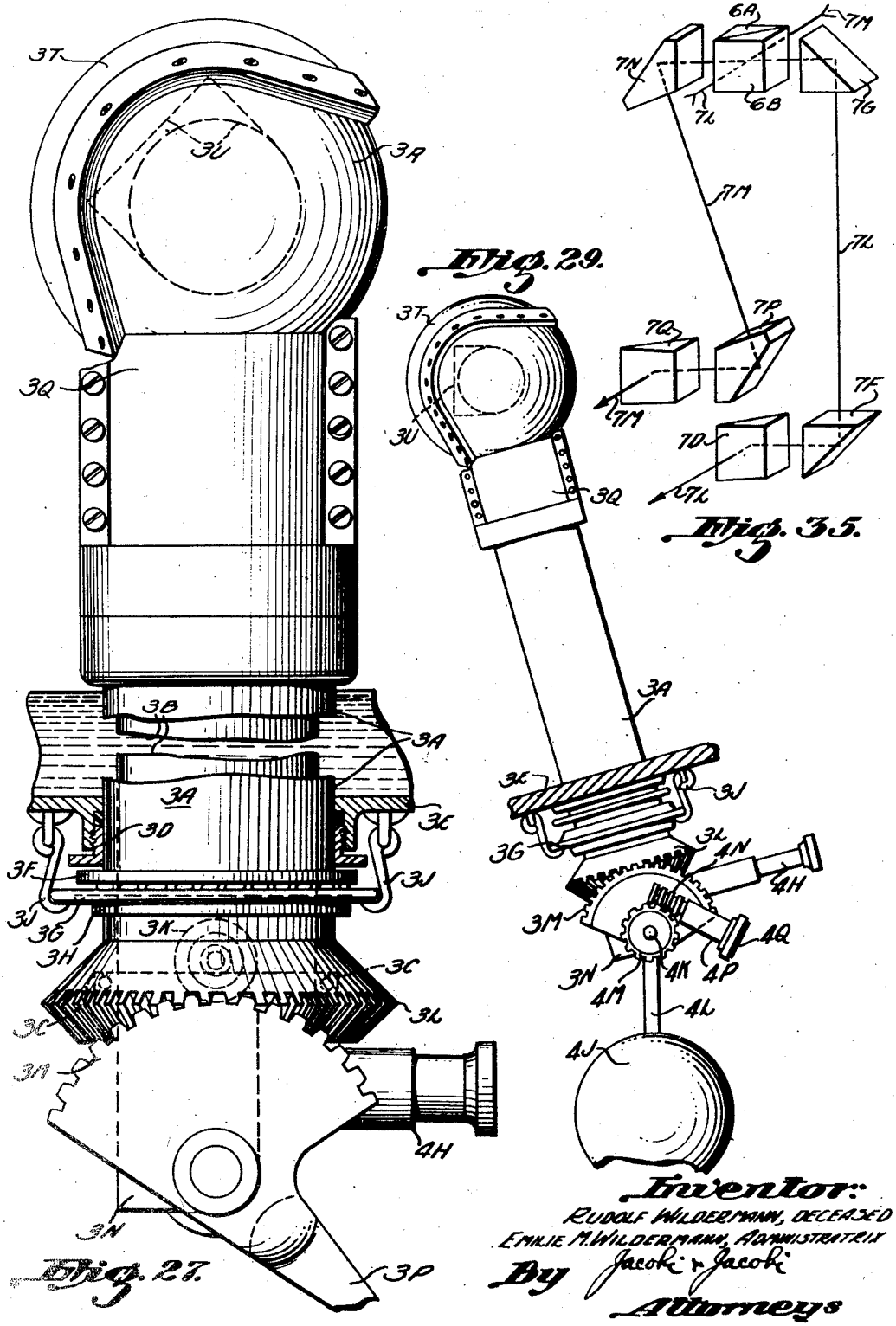

Nov. 18, 1947.    R. WILDERMANN    2,431,290
CONTROL GEARING AND LEVER
Filed Aug. 13, 1942    9 Sheets-Sheet 9
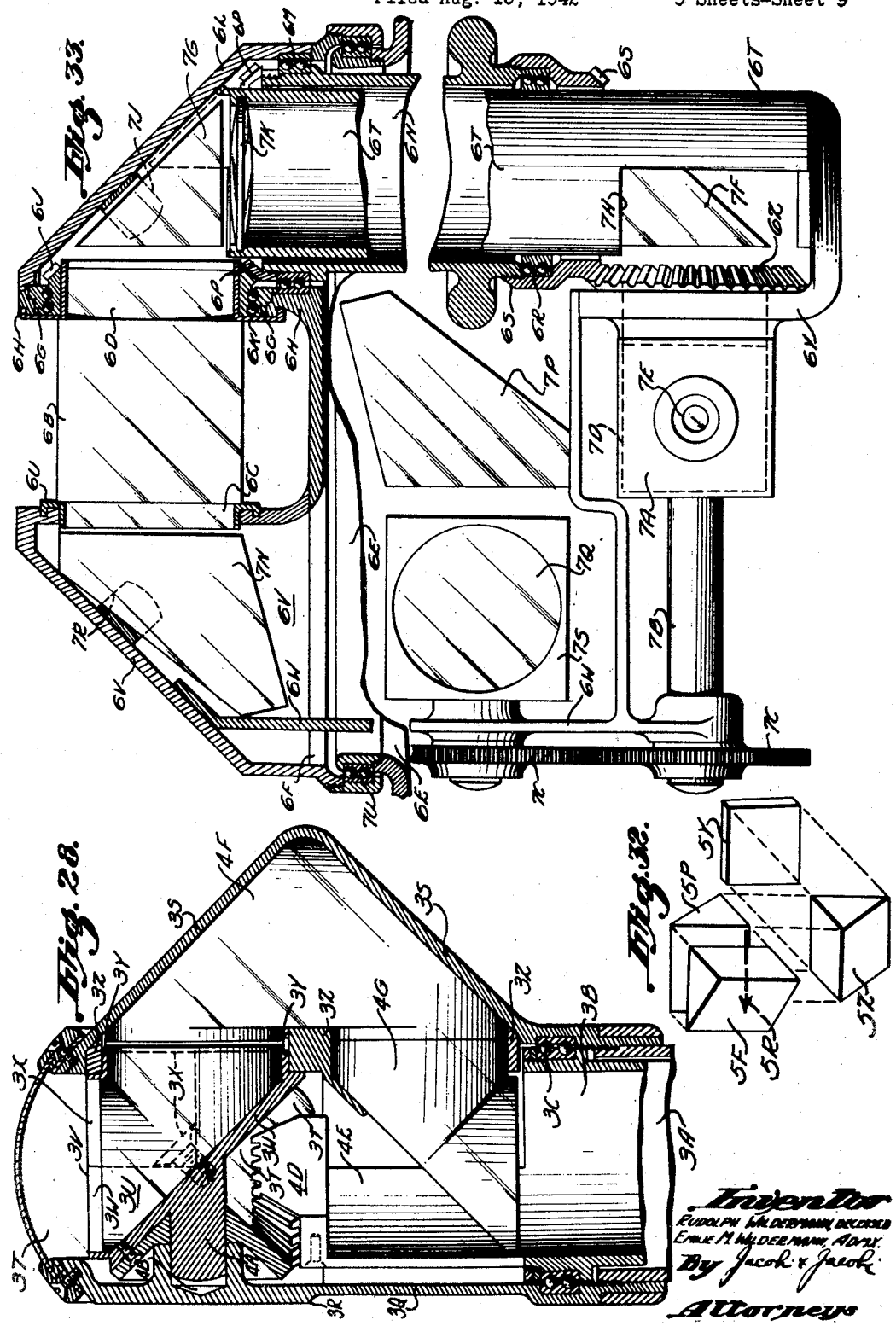

Patented Nov. 18, 1947

2,431,290

UNITED STATES PATENT OFFICE 2,431,290

CONTROL GEARING AND LEVER

Rudolf Wildermann, Mount Vernon, N. Y.; Emilie M. Wildermann administratrix of said Rudolf Wildermann, deceased Application August 13, 1942, Serial No. 454,663

10 Claims. (Cl. 74—471)

This invention concerns a control of a plurality of components of movement by a single directive element. There are means interconnecting a plurality of control means, e. g., of coordinated fluids for purposes of a joint, collective and complementary control with particular purview of ease of handling for the operator or user. Conversely, three-dimensional movement is controlled by coordinated components of movement in a plane.

With the progress of refinement of implements of peace and war, improved accommodations in facilities for the selective and joint use of implements are in order, for instance, in the dispensing of fluids, like electricity, gas or liquids, in a remote, multiple control, in directional equipment, etc. For instance it may be desirable to provide for a joint control for a number of selective sources of light, each representing a base color, so that either the joint intensity or their complementary intensities, or both, may be regulated at random, preferably by simple manipulation with one hand. Or the component controls of a crane or digger are correlated for simple manipulation. Or to elucidate by way of an every-day commodity, it is desirable to control a hot and cold water faucet in such a way, that manipulations by the same hand may control the joint flow of hot and cold water and the complementary flow of hot and cold water at will, and that there be facilities of interpolation either way.

This invention applies in an analogous manner to sets of component control operations and for various fluids, such as electricity, gas or liquids. Except where special adjustments are in order, standard implements like rheostats or chokes, cocks or valves, instruments and devices are or may be used, and their desired angular or linear movements may be translated by suitable gearing, in order to conform to the control equipment disclosed herein.

Whereas the invention is herein primarily illustrated in connection with valves suitable for hot and cold water conduits, it is understood from the preceding paragraph that such valves may be readily replaced by control means suitable for other fluids.

It has been attempted in the past to provide for control means along the lines here suggested. But there the various control movements were not concernedly coordinated, and necessitated complicated and inconvenient manipulation on the part of the user. Thus, for instance, a control wheel was provided which was rotated for exercising one of the controls desired. At the same time the control wheel was, by way of its support, fulcrumed at a point remote from the control wheel, and exercise of the additionally desired control was effected by swinging or revolving the wheel around said fulcrum.

Such control is complex by itself; manipulation is difficult because the planes in which it is exercised, and the axes of rotation are not coordinated. Nor does this allow a converted checking by vision, touch, or both.

The disadvantages are overcome by the instant invention, and more particularly all control movement is oriented in respect to a common origin, on the order of the origin of a system of coordinates. By way of a preferred solution of the problem this invention provides a universally fulcrumed directive element which exercises either a joint or complementary control, or both, according to the direction in which it is shifted. Or it is conversely controlled.

The prior art in this field entailed the other disadvantage, that the control gearing had to be interposed between the fluid control means regulated thereby. As a matter of fact the gearing had to be aligned between oppositely disposed fluid control stems. According to this invention the control means may be variously disposed in respect to each other and to the control gearing and lever and, furthermore, the controlling or controlled element may be placed at a preferred, remote point.

Thus the invention provides transmitter shafts, of which one may be disposed in the other, for positive transmission of any kind of movement within a solid angle, either for faithful reproduction at the other end, or for control from such other end. Accordingly a relative and combined angular adjustment of a pair of transmitter shafts is to permit remote training of a device into any angle.

On the other hand there is the converse object to adjust at will a plurality of devices by a single universally fulcrumed control handle.

Additional objects of this invention will be better understood from the following description thereof. The embodiments shown and described are not to be interpreted in limitation of the invention, but as exemplary illustrations of the general and of particular features of the invention.

In the drawings:

Fig. 1 is a partly sectioned side view of an embodiment of this invention, the section and view being taken at a level and in a direction pointed out in Fig. 2 by a dot-dash line and an arrow, respectively, which are identified by the numeral 1.

Fig. 2 is a corresponding side view, in which one of a pair of symmetrically positioned valves is not shown, and in which the gearing is in part centrally cross-sectioned.

Fig. 3 shows, partly in cross-section, the elevation of an embodiment of the invention, which is suited for mounting on a top of a basin B, and which is in a mixed open position.

Fig. 4 is a corresponding plan view.

Fig. 4a is a side view of the embodiment of Figs. 3 and 4 applied, however, to a few parts only, in an "off" position.

Fig. 5 shows a partly cross-sectioned side view of a modification of the embodiment of Figs. 3 and 4.

Fig. 6 is a cross-sectioned top view of the stem of a valve of Fig. 5, the section and view being taken at a level and in a direction pointed out in Fig. 5 by a dot-dash line and an arrow, respectively, and the numeral 6.

Fig. 7 shows part of a plan view, corresponding to the showing of Fig. 5.

Fig. 8 shows a corresponding detail front view of the drain control means showing behind a section, the level of which is pointed out in Fig. 5 by a dot-dash line and the numeral 8.

Fig. 9 shows the elevation of a wall W in which an embodiment of this invention is embedded.

Fig. 10 is a corresponding cross-sectioned side view.

Fig. 11 is the side view of an embodiment of the invention mounted on a wall W, for instance above a sink.

Fig. 12 is a corresponding bottom view.

Fig. 13 is a perspective view of another modification of the embodiments of Figs. 3–8.

Fig. 14 is a diagram symmetrically illustrating the control movement to be carried out by a device of the instant invention.

Fig. 15 is another embodiment of the instant invention shown in a side view.

Fig. 16 is a corresponding, small scale top view, the device being shown applied on a corner basin B.

Fig. 17 is the side view of another embodiment of this invention.

Fig. 18 is a corresponding small scale top view.

Figs. 19–22 illustrate a triple control embodiment of this invention.

Fig. 19 is a cross-sectioned side view of such embodiment, a brush arm being superimposed upon the cross-section.

Fig. 20 is a corresponding, small scale bottom view.

Fig. 21 is a diagram for lighting control by such an embodiment.

Fig. 22 illustrates the functioning of the triple control by a schematic view, which may be related to the showing of Fig. 19 as an upside-down end view from the right, upon a small scale.

Fig. 22a is another control diagram.

Fig. 23 shows a schematic perspective for the control and check of airplane tabs.

Figs. 24 and 25 are front and fragmental side views of the respective control instrument, the latter view being partly sectioned, but the pointing means being superimposed in full.

Fig. 25a shows a section of the spherical dial.

Fig. 26 is a partly sectioned front view of an instrument incorporating the instant controls with a theodolite.

Figs. 27 and 28 are an elevation and a sectioned side view of a periscope.

Fig. 29 is an elevation like that of Fig. 27 modified to illustrate how this invention may provide for automatic level adjustment of sight, e. g. of a periscope on a rocking vessel.

Fig. 30 is the elevation of a simplified embodiment of a periscope of this invention.

Fig. 31 is a corresponding side view showing a cross-section of the head of the periscope.

Fig. 32 is a corresponding schematic showing of the respective apparatus, the parts being arranged for horizontal view whereas they are shown in Fig. 30 in the extreme alternative position, i. e. looking up.

Fig. 33 shows, by way of modification, a double periscope in a front elevation.

Fig. 34 is a corresponding top view.

Fig. 35 is a schematic view of the reflecting apparatus of Fig. 33.

Fig. 36 is a side view of an embodiment differing as to certain details from that of Figs. 30–32.

Of the embodiments of the drawings those of Figs. 1–18 are exemplarily applied to liquids, such as water, serving in that case, for instance, to control the flow of and the mixing of hot and cold water.

The embodiments of Figs. 19–22 illustrate, how a device of this invention may be applied for electrical control where it may regulate resistance, reactance, etc., but serving in this particular instance merely for the regulation of a full range of colored light.

The remaining figures show various mechanical and optical applications of the invention, illustrating also, by itself or in combination, that the control of the invention may be applied in the converse for causing a universal movement.

Those acquainted in the mechanical arts understand that the control by levers as illustrated in Figs. 11 and 12 is exchangeable against that exercised by gears proper as shown in the other figures, all these means being generally classified under the caption of gearing.

Similar numerals refer to similar parts throughout the various views.

In connection with sinks a hot and cold water supply is common today, where hot and cold water valves are spaced apart above the sink, and their outlets connect to a common spout. Thus the embodiment of Figs. 1 and 2 shows hot and cold water supply lines 20 and 21, issuing for instance from a wall and connected to hot and cold water valves 22 and 23, respectively, by couplings 24 and 25. The outlets of valves 22 and 23 are interconnected by piping 26, from which issues a common spout. The spout is not shown, but is exemplified at S in Figs. 11 and 12.

The valves 22 and 23 are oppositely disposed, their stems 27 are axially aligned and extend towards each other. For purposes of this description let it be presumed, that these valves 22 and 23 are similar in construction, so that they correspond in opening to similar angular movements of the stems 27, but that the valve 22 is a left-hand valve and the valve 23 is a right-hand valve. In other words, valve 22 will be opened, valve 23 however closed by a right hand movement of the respective stems. If we now imagine the square heads of the stems 27 to be interconnected by a square tube, the valves will be closed together, when such tube is rotated in one direction. They will open analogously, when the tube is rotated in the other direction, and they will always supply like amounts of hot and cold water, provided the hot and cold water are supplied to these valves at the same pressure head.

Instead of such an imaginary square tube, the following gearing is interposed between the valves 22 and 23. Upon the square head of each of the valve stems 27 is longitudinally slidably engaged a tube 28, which is round upon the outside, square upon the inside, and engages at the other end upon a correspondingly shaped collar 29 of a bevel pinion 30.

The tubes 28 are journalled in sleeves 31 and 32, which extend from opposite sides of the cup-shaped housing 33, and which substantially close over the exposed parts of the stems 27.

Onto the cup-shaped housing 33 rotatably fits a cover 35. Lobes 34 extend on opposite sides from cover 35 over the cylindrical surface of the cup-shaped housing 33. The lobes 34 are narrow enough to allow a predetermined oscillation of cover 35 on housing 33. Through aligned openings of the lobes 34 fit, respectively, the larger shoulder 36 and the smaller threaded shank at the end of a handle or control lever 38. Lever 38 is secured upon cover 35 without clamping the housing 33; e. g. nut 39 presses and retains the respective lobe 34 on the face at the end of shoulder 36, said face being preferably rounded to follow the inner curvature of said lobe. Shank 36 fits through the cylindrical wall of gear housing 33 by way of transverse slots 40, so that aforementioned oscillation of the cover 35 is permitted. Since the slots 40, and more particularly the bottom edge thereof, engage shoulder 36 from below, cover 35 is retained upon the gear housing 33.

Upon shoulder 36 is mounted a lug 41. Opposite sides of this lug abut the hubs 42, which centrally protrude from pinions 30. Thus the pinions are endwise allocated in the housing, their reactions being taken up on the shoulders 44 in the back of the pinions by suitable bevelled faces upon the inside of the gear housing 33. Therefore the pinions 30 will not participate in any reciprocating movement of the valve stems 27, when said stems are screwed into and out of the respective valves, but the square heads of said stems 27 slide back and forth in the tubes 28.

Stud or pin 43 forming part of lug 41 relatively rotatably extends into a suitable hub 45 upon the inside of the cover 35. Concentrically around said pin and hub extends upon the inside of the cover 35 a bevel gear formation 46, which meshes with the pinion 30.

In accordance with the foregoing, lever or handle 38 is universally fulcrumed relatively to the center of the housing 33. In order to analyse the mode of operation of the device let us presume that in a level position of the handle 38 straight to the front, which position is shown in Figs. 1 and 2, both valves, the hot water valve 22 to the left and the cold water valve 23 to the right, are shut off. Now let us observe, for comparison, the movements of the tip T at the very front of the handle or lever 38. Of course it moves always in a spherical plane. Such movement may be scrutinized in the flat projection of the diagram of Fig. 14. In the level, frontward position of lever 38 of Figs. 1 and 2 the position of tip T corresponds to the lowest point of the diagram of Fig. 14. Movement of the tip T along the dot-dashed line A then corresponds to a swinging of lever 38 in a plane normal to the axes of the valve stems 27. During such movement of the handle 38 cover 35 does not move relatively to the gear housing 33, so that the bevel gear and pinions 46, 30 also remain interlocked at a fixed position. Therefore there will be always an even flow and even mixing of the hot and cold water in like parts, when the tip T moves in a plane corresponding to line A.

But when tip T moves transversely, i. e. the lever 38 is shifted in a plane it shares with the axes of valve stem 27, the gears 46, 30 come into play, rotating the valve stems 27 in opposite directions, so that for any angular opening movement of the stem of either one of the two valves, a corresponding angular closing movement is performed on the other valve. Of course, in the position of the lever 38 in Figs. 1 and 2, which corresponds to a position of the tip T at the bottom of the triangle of Fig. 14, lever 38 cannot be moved transversely at all, because both valves are closed, and movement to the left is not possible, because the cold water valve 23 (to the right of Fig. 2) cannot be closed any more; nor is movement to the right possible, because the hot water valve 22 cannot be further closed.

But when lever 38 is moved up, bearing sharp to the left, so that tip T substantially follows the left side of the triangle of Fig. 14, then the hot water valve 32 remains closed, whereas the cold water valve 23 opens and it is fully open when tip T reaches the left top corner of the triangle of Fig. 14. If now the lever 38 is moved to the right in the plane it shares with the axis of valve stem 27, tip T substantially follows the top side of the triangle of Fig. 14, the hot water valve 22 begins to open, and in the degree in which it is opening, the cold water valve 23 closes, until the cold water valve is fully closed and the hot water valve is fully open, when tip T reaches the right end corner of the triangle of Fig. 14.

If the lever 38 is pushed down, bearing sharp to the right, it continuously reacts upon the cold water valve in its closed position, so that the cold water valve remains closed, whereas the hot water flow is continuously diminished, until the hot water valve is also closed, i. e. the lever 38 has returned to the position of Figs. 1 and 2, where tip T has arrived at the bottom point of the triangle of Fig. 14.

Thus any combined flow of hot and cold water and any degree of mixture of hot and cold water—to the elimination of either one of them—may be obtained by adjusting tip T within the space coarsely outlined in Fig. 14, vertical movement regulating the joint flow, and transverse movement regulating the complementary flow of hot and cold water.

By way of contrast to Figs. 1 and 2 the modifications of Figs. 3–10 show, by way of example, an even ratio of gearing, the embodiments next to be described using specific bevel gearing, i. e. miter gears 50, 51 and 52. For the purpose of simplified construction, but also in order to facilitate the understanding of the drawing, these gears are shown to be integral with other parts in the embodiment of Figs. 3, 4 and 4a. Thus a bushing 53 extends up from miter gear 52, and said gear connects below by way of neck 54 to a flange 55, from which depends, in turn, the sleeve 56 with shoulder 57. A vertical guide means is provided upon the basin B by a bush, which is clamped onto the basin B by means of suitable nuts 58. Bush 58 rotatably accommodates flange 55 and sleeve 56, a collar 60 serving to take up end play below. Collar 60 is angularly adjustable on shoulder 57 by a clamping screw 61, and forms part of an arm 62. A connecting rod 63 connects this arm to an arm 64 of like length on valve 65, which controls the hot water supply 66.

Shaft 67 and miter gear 51, which parts are shown to be integral with each other, are journalled in bushing 53, neck 54 and sleeve 56, and are retained in endwise abutment upon the sleeve 56 by a coupling 68 at the lower end of shaft 67. Coupling 68 also serves to connect gear 51 directly to the valve 69, which controls the cold water supply pipe 70. The side outlet valve 69 and the hot water valve 65 interconnect by way of the side outlet L 71. From here the joint flow of hot and cold water is directed by a riser 72 through the spout 73 into the basin. Parts 71, 72 and 73 are sectioned away and thus not shown in the view of Fig. 3. Both valves 65 and 69, are presumed to be, for the purpose of the instant embodiment, left hand valves, so that, seen from the top in Fig. 4, valve 65 is turned off when the arm 64 is swung in counter-clockwise direction.

Lug 74 is rotatably interposed between miter gears 51 and 52 and is journalled upon the sleeve 53. From lug 74 extend oppositely aligned pivots 75, upon which the spherical shell 77 is journalled without end play (balls 76). Miter gear 50, which is the driver gear, is disposed concentric with pivots 75 and is shown in the drawing as an integral part of the housing portion 78 of the spherical shell 77.

From the housing portion 78 extends, beyond the parting line 79, a constricted, outwardly threaded shoulder 80, which serves to receive the cover portion 81 of the spherical shell 77. A threaded stud 82 which extends radially out from the housing portion 78, engages the handle lever 84, so that the cup formation 83 at the bottom of the handle lever 84 is drawn onto the spherical shell 77 and retains the housing portion 78 and the cover portion 81 in their assembled relationship. Key holes 85 may be provided on the cover portion 81, and allow the cover portion to be assembled, in the first instance, by a suitable key with the housing portion 78.

The position of the device in Fig. 4 corresponds to that of Fig. 3. The handle lever 84 is pointed up at an angle, which corresponds to a position of the tip T at or above the top side of the triangle of Fig. 14 on line A. Both valves 65 and 69 are open in a position of mixing even parts of hot and cold water. The "off" position, in which the handle lever 84 extends at an angle down, is indicated in the side view of Fig. 4a. In order to permit the handle lever 84 to swing in the spherical shell 77 from the former full mixing position to the latter "off" position, a slot 86 is provided in the spherical shell, which extends from a point 88 to the front to point 89 in the back, substantially to the width of zone 87. Zone 87 on the surface of the spherical shell 77 is delimited by the parting line 79 upon one side of the spherical shell, and by a groove 90 which is symmetrical to said parting line 79 upon the opposite side of the spherical shell 77. According to Fig. 3 a sector of threaded shoulder 80 corresponding to the length of slot 86 is also cut away, so that the assembling of parts is facilitated.

Operation of the device of Figs. 3, 4 and 4a is similar to that of the embodiment of Figs. 1 and 2, and it also substantially follows the diagram of Fig. 14. When handle lever 84 is swung in a vertical plane, the gears 51 and 52 are rotated opposite to each other, through like angles. But since the lever gearing 62, 63, 64 reverses the direction of rotation during transmission from gear 52 to valve 65, valves 65 and 69 are always rotated through corresponding opening or closing angles, when handle 84 is swung in a vertical plane.

When, on the other hand, the handle lever 84 is transversely swung—remaining at the same angle of vertical incline—gears 50, 51 and 52 remain interlocked in a relatively stationary position, so that gears 51 and 52 rotate in unison and in the same direction. But, on account of the reversal of direction of rotation during transmission by reason of gearing 62, 63, 64 valve 65 operates in a sense opposite to valve 69, i. e. it closes when valve 69 opens, and it opens when valve 69 closes. Thus we have again a component of joint operation of the hot and cold water valves during vertical swinging of the handle lever 84, and a component of complementary control of flow in the two valves, when lever 84 is transversely swung. Moving the handle lever 84 through angles within the space substantially defined in the triangle of Fig. 14 yields, therefore, any preferred quantitative or relatively qualitative control of the flow of the hot and cold water.

Since the neck 54, and correspondingly the shaft 67, may be made of any reasonable length, the arrangement of Figs. 3 and 4 is suitable for remote control. Anybody versed in these arts understands, that the lower end of sleeve 56 and shaft 67 may be connected in any preferred manner to the control means to be operated thereby. Meshing, for instance, a gear on shoulder 57 with a gear on the stem of valve 65 we obtain the same kind of transmission as by gearing 62, 63, 64. Or those connections, that of the sleeve and that of the shaft therein, may apply directly to the respective control means. This is illustrated in the modification of Figs. 5–8, which will now be discussed.

Here a bushing 91 extends from a spherical shell 92, and these integral parts are substantially split in half longitudinally, the halves of the spherical shell having an inner rim 93 and an outer rim 94, respectively, which overlap each other and retain the parts in alignment. A threaded shoulder at the lower end of the bushing 91 permits the two halves thereof to be held together by a pair of nuts 95. At the same time nuts 95 serve to provide endwise thrust on a stand 96, in which the bushing 91 is journalled. By way of a washer 97 stand 96 closes over an opening 98 in the top of a basin B, and may be suitably clamped in position.

Hot and cold water cocks 99 and 100 are aligned with each other, one on top of the other, below said bushing 91. The outlets of these cocks 99 and 100 are connected by manifold 101, which opens into a cavity in stand 96. From this cavity a spout 102 extends over the rim on top of basin B into the basin.

A forked handle lever 103 is oscillatably pivoted over the spherical shell 92, and may serve to retain the two halves of said spherical shell in their assembled position. One of the pivots, by which the forked handle lever 103 is engaged upon the shell 92, is a stud 104 forming the shaft of miter gear 50 and engaging upon the respective arm of the forked handle lever 103 by a key 104a and flat head screw 105.

Miter gears 51 and 52 mesh with miter gear 50. The upper end of a shaft 106 upon which the miter gear 51 is mounted and a shoulder 107 in back of miter gear 52 are journalled in the spherical shell 92, between the halves thereof. Suitable hubs 125 upon the inside of spherical shell 92 space the gear 50. Shoulder 107 is shown to be shaped to engage the stem of valve 99, having, for instance, a square opening, which fits over the square end of stem 108 of cock 99.

Through the center of the clearance slot 109 in stem 108 extends a solid portion 110 (Fig. 6), so that a bore may extend clear through the center of stem 108, without interfering with the flow of a fluid through cock 99. Said bore rotatively accommodates the stem of shaft 106 of gear 51. Shaft 106 is suitably engaged upon the stem of cock 100.

A finger 111 carrying a slanted lug 112 at its end extends from the lower end of stem 108 of cock 99. A similar finger 113 is attached to the stem of cock 100, extends past the other side of manifold 101, and bears an oppositely slanted lug 114 at its end at a level corresponding to that of lug 112. With the lugs 112 and 114 are associated upright flats 115 and 116, respectively, which extend at opposite angles to the front, but terminate short of the front ends of lugs 112 and 114. The fingers 111 and 113 together with the lugs 112 and 114 and the flats 115 and 116 swing around with the stems of the valves 99 and 100 and are shown in their frontmost positions, in which they almost close from opposite sides over the manifold 101. When swung into such front position, these parts slide onto the shelf 117 and are supported thereby. Shelf 117 is mounted upon the manifold 101 and the opposite ends of the top of the shelf 117 are bevelled, in order to permit the lugs and flats to ride thereonto.

An overflow opening 118 is shown in the vertical wall of basin B, said overflow opening leading into a drain compartment surrounded by the wall 119. That drain compartment accommodates, with a certain amount of transverse play and play to the front and the back, a flat drain control rod D which corresponds to rods of this kind commonly known, inasmuch as the drain hole at the bottom of the basin (not shown) is open when rod D is in the elevated position shown in the drawing. When this rod D is pushed down or allowed to drop down, the drain at the basin B is closed.

But instead of extending through the top level of basin B for purposes of manual control, as customary, rod D is bent back below the top of the basin and the bottom end of the bent back portion 120 is shown to rest on top of shelf 117. The aforementioned play of rod D to the front and to the back is checked by a flat spring 121 mounted upon the wall 119. This flat spring normally presses the bent-back portion 120 of rod D back onto the manifold 101, thus preventing the bent-back portion 120 from slipping to the front, off the shelf 117.

The bent-back portion 120 of rod D is provided with symmetrical cam formations 122 on opposite sides. Each of these cam formations 122 provide faces 123 and 124 on their outer and inner sides, which faces are slanted for the purpose of sliding engagement with the lug 114 (112) and the flat 116 (115), respectively.

Figs. 6–8 illustrate that and how, by virtue of the joint and complementary hot and cold water control, means for regulating the drain of a basin may be added to such control.

While there is a difference of arrangement of the parts of the miter gear control, as compared with the showing of Figs. 3 and 4, the method of operation of the device of Figs. 5–8 is exactly the same, as far as joint and complementary control is concerned, as the one then described. In the modification of Figs. 5–8 transverse movement of lever 103 causes the spherical shell 92 and the miter gears 50, 51, 52 to oscillate around a vertical axis, as it was the case in connection with the corresponding parts of Fig. 3. But the spherical shell of the modification of Fig. 6 does not participate in the swinging of lever 103 in a vertical plane, as it was the case in the modification of Fig. 3, though in both cases the miter gears will participate in such movement and will transmit the motion to the valves back of the basin.

By virtue of a journalling of stem or shaft 106 above the respective miter gear 51 a firm support for miter gear 51 is provided, and it may not be necessary to allow such stem to bear upon the inside of gear 52, nor upon the inside of the stem 108—although it so appears in the drawing—but clearance may be provided at these points, thus overcoming any undue and unbalanced friction.

Since the arrangement of Figs. 5–8 does not provide for a reversal of the sense of direction in connection with the transmission of one of the valves, the cocks 99 and 100 will open and close in opposite directions, and must be accordingly arranged.

For purposes of operating a drain in connection with the joint and complementary control, it is desirable to permit movement of the control lever beyond the point, at which both control means are closed. In connection with valves such movement beyond the closing point may be attained by the use of elastic means, the valves being closed before the elastic means yield. Additional movement beyond the valve closing point is then attained by further progressing against the reaction of the yielding elastic means.

A cock may, on the other hand, be ordinarily moved beyond the point where it is closed. As a matter of fact both cocks 99 and 100 have passed the closing point and have progressed therebeyond—although the cocks are still closed—to a point where the fingers 111 and 113 are stopped by the manifold 101. As mentioned above the drain is open, when drain control rod D is in an elevated position and its bent-back portion 120 rests on the top of the shelf 117.

When now the control lever 103 is lifted, opening either one or both of the cocks, then one or both flats 115 and 116 will swing away from manifold 101. In so doing, and in swinging around the axis of the cocks, the moving flat or flats will bear upon one or both faces 124, thus pushing the bent-back portion 120 of rod D to the front. Thus the said portion 120 slides off shelf 117 and drops down, and the dropping drain control rod D closes the drain of basin B. It will be understood, that thereafter, as long as one or both of the cocks are open, the drain is closed. This is normally desirable, because the running hot or cold water should not go to waste immediately. Nor will the drain be closed again when only one cock is shut off, and the water in the other is still running. Because as stated above, the drain rod D has a certain amount of transverse play, so that the one cock being closed when striking and pressing against the respective face 123 will merely push the drain control rod D over the other side, without lifting it. Nor does the closing of both cocks necessarily open the drain. When both cocks have just been shut off, the lugs 112 and 114 have reached a position in which they just about touch the opposite faces 123 of the cam formation 122, without actually acting thereon, and without lifting up the drain control rod D. But the operator is aware of this point by sense of touch, and when both cocks are pushed beyond that point at which they have shut off the respective flows of water, then they push up—under an increased effort of the operator—the bent-back portion 120, thus opening the drain by lifting control rod D. Once the fingers 111, 113 have been pushed so far beyond the shut-off position, that they both strike the manifold 101, then the lower end of the bent-back portion 120 has been raised above the shelf 117 and will now be pushed back by spring 121 against the manifold 101. If the handle 103 is now released, we find the parts at the starting point shown in the drawing, at which the foregoing description of the operation began.

It is further understood that the additional drain control can readily be incorporated into the modifications shown in other drawings. It is also understood that different modifications shown in connection with all embodiments do not necessarily exclusively belong to certain embodiments, but that the various features of the various embodiments may be exchanged, as circumstances may require. Anybody versed in this art will therefore readily recognize how a tiltable, spherical shell 77, having an unforked handle lever 84, may replace the spherical shell 92 and forked handle 103 of the embodiment of Figs. 5–8, thus yielding the device shown in Fig. 17.

Instead of applying to or through a housing surrounding the miter gears, the control lever may apply directly to a ball socketed, as part of a universal joint, between said gears 50, 51 and 52. This leads to a very simple modification of this invention. Such an embodiment is shown in Figs. 9 and 10, where it is applied to a control behind a wall W, say in connection with the pair of hot and cold water pipes 131 and 132 leading to an overhead shower.

These pipes are respectively controlled by valves 133 and 134. The valve stems 135 and 136 are directed towards each other, as it was the case in the embodiment of Figs. 1 and 2, and the miter gears 51 and 52 are countersunk from the back in square formation to a limited depth, and they engage longitudinally slidably upon the square ends of the valve stems 135 and 136. A cover plate 137 closes the necessary clearance opening in wall W, and provides upon its back the webs 138 which have notches, into which the pipes 131 and 132 are drawn by straps 139 (acorn nuts 140). The webs 138 are interconnected by ribs 141 which engage upon and rotatably support the miter gears 51 and 52, the bearing caps 142 closing over grooves provided for this purpose in the shanks of the miter gears 51 and 52.

The three miter gears 50, 51 and 52 are countersunk at their front, in order to fit like sockets over the central ball formation 143. Miter gear 50 is affixed to the end of the shaft 144 which represents the shank of a rivet-like piece and which rotatably fits through a bore in the spherical segment 145, a part of the central ball formation 143. From opposite sides of this spherical segment 145 extend the axially aligned studs 146, which are journalled in the front of the bores of the miter gears 51 and 52, the rears of these bores being square, as stated before, in order to accommodate the square ends of stems 135 and 136. A depression 147 in the cover plate 137 substantially has the shape of a triangular pyramid pointing toward the center of the ball formation 143. This depressed part 147 is truncated, being shaped to offer a socket slidably closing over the ball formation 143.

A handle lever 148 extends through the said depression from the spherical segment 149 of the central ball formation 143. This spherical segment 149 is the head of the rivet-like piece, the shaft 144 having previously been described as the shank of this piece.

Operation of the embodiment of Figs. 9 and 10 corresponds in every respect to that of the previously described devices and reference may be had to Fig. 14. The depression 147 circumscribes the space in which handle lever 148 is moved around in order to permit, starting from the "off" position in which it is shown, any desired adjustment of flow in the pipes 131 and 132. When handle lever 148 is swung in a vertical plane, miter gear 50 does not rotate, but it rotates the gears 51 and 52 through like angles in the same direction. When handle lever 148 is transversely moved, shaft 144 is rotated in segment 145, the miter gear 50 rotates relatively to the segment 145, and the two other miter gears 51 and 52 are rotated through like angles, but in opposite directions. The latter, transverse movement yields the complementary component or control, whereas movement of handle lever 148 in a vertical plane yields the component of jointly opening and closing valves 133 and 134. For reasons of mechanical arrangement, the handle lever 148 is not shown in a plane exactly normal to the axis of the gear 50. Nevertheless the same results are attained as in the other cases, as long as this handle is disposed "substantially" normal to the axis of said gear. Throughout, however, the handle lever 148 extends at a fixed angle relatively to the axis of the driver gear.

The embodiment of Figs. 11 and 12 serves to illustrate that the control gearing may consist of levers only. For this illustration the wall fixture embodiment above a sink is chosen again. The hot and cold water supply pipes 151 and 152 are shown to extend quite close to each other from the wall W, so that the stems 155 and 156 of the left and right hand angle valves 153 and 154 are directed, for purposes of economy of space, parallel with each other down. The outlets 157 and 158 of the hot and cold water valves, 153, 154, connect above with each other at an obtuse angle, and a pipe 160 descends from this point 159 of angular interconnection. To the lower end of descending pipe 160 the coupling 161 connects the swing spout S.

The hot and cold water valve control arms 163 and 164, which are angularly adjustably mounted upon the stems 155 and 156, extend according to the drawing parallel with each other in an "off" position. To this position corresponds a top position of the handle lever 162, so that the schematic diagram of Fig. 14 has to be reversed into an upside down position for purposes of orientation concerning the operation of an embodiment of Figs. 11 and 12.

In order to apply a joint and complementary control to the pipe system just described, a bottom-wise open housing 165 may be mounted thereover, being for instance fastened by nuts 166 upon studs 167 protruding from wall W.

The solid control ball 168 is shown to be seated in a correspondingly shaped opening of the slanting top-front wall 169 of housing 165 so that part of the ball 168 protrudes from the housing and from that protruding part arises the handle lever 162.

Control ball 168 is retained in oscillatable position by a cage 170 strapped over it onto the inside of the housing 165. The cage 170 may be provided with suitable symmetric slots 171 upon opposite sides thereof, which slots guide the pivots 172 extending opposite to each other from opposite sides of the ball 168 for purpose of orientation of the movement of the ball 168 in its socket. The bottom of cage 170 is cut away, at 173, so that the ball 168 protrudes downwardly. A tube 174 is inserted into a threaded hole in this downwardly protruding portion of ball 168. Tube 174 is hemispherically closed at its outer end 175. In this outer end 175 the connecting rods 176 and 177 are relatively independently, universally socketed. By way of balls 178 and 179 at their other ends the connecting rods 176 and 177 are universally socketed in the free ends of arms 163 and 164, being retained thereon, for instance, by suitably recessed cover plates 180 and 181.

The universal socketing of the connecting rods 176 and 177 in the hemispherical outer end 175 of tube 174 may, for instance, be effected as follows:

The connecting rods 176 and 177 carry hemispherical shells 182 and 183 at the respective ends, which shells fit together into the hemispherical outer end 175 of tube 174, around a solid ball 184. The connecting rods 176 and 177 extend from the respective hemispherical shells 182 and 183 through a suitable slot 185 in the hemispherical outer end 175 of tube 174. The shells 182 and 183, as they are assembled around solid ball 184, are retained at said outer end 175 by a spacer 186, which rests at its opposite end in the bottom of the tapped hole, in which tube 174 is mounted upon ball 168.

In order to understand the operation of this embodiment of Figs. 11 and 12, let us swing the handle lever 162 down, bearing hard to the right. At the end of this operation the hot water valve 153 is fully open, whereas the cold water valve 154 has remained closed. This new position of parts is indicated in the drawing by dot-dash lines, the moved part being designated by their original numbers to which a prime has been affixed.

During the said operation, the universal socket at the end of tube 174 was swung, under tension, in a circle around the universal joint at the end of arm 164 of valve 154, which has thus remained in a closed position. Arm 163 was pushed through substantially 90° so that the hot water valve 153 is now fully open.

If, starting from this new (dot-dash) position, the handle lever 162 is swung transversely, the valve 154 opens during this movement complementary to the closing of valve 153. Eventually a position is reached in which the cold water valve 154 is fully opened, whereas the valve 153 is shut off. This new position is a transverse reversal or mirror picture of the dot-dash position of parts in Fig. 12.

Retracing part of the last movement, until the handle lever 162 has been returned to a center bottom position, we find both valves 153 and 154 equally open which is an even mixing position. When the lever 162 is now moved straight up, back to the original position of Figs. 11 and 12, this corresponds to a movement along line A of Fig. 14 in an upward direction, but in an upside down position of the diagram of Fig. 14. This movement represents a balanced decrease of the joint flow of hot and cold water through the two valves until both are shut off.

It is understood by those versed in the art here concerned, that a lever control system of the type illustrated in Figs. 11 and 12 may at any time be converted for substitution for the system of gears shown in any of the other embodiments illustrated. The converse is also true, i. e. a system of gears may replace the lever system of Figs. 11 and 12. But in the latter case the valve stem connections should be, for instance by way of additional gears, reduced to axial alignment, if a system of gears is used, where the driving gear is rotated around its own axis for one control, or revolves, for the other control, around the axis of the driven gears connected thereto. When the valve stems are parallel with each other, as for instance shown in connection with valve stems 135 and 136 of Figs. 11 and 12, a pair of intermediate, axially aligned shafts are each connected, e. g. by helical gears, to one of the stems 165 and 166. Bevel or miter gears of the type illustrated in the other embodiments may then be used for connecting a common driver to the intermediate, axially aligned shafts.

It is desirable to establish a range of control in a substantially equilateral triangle, as it is shown in Fig. 4, because normally it is neither convenient to have this triangle very high, nor is it desirable to have it very flat. Adjustments in this respect may be attained by the choice of bevel gears. The following rule will be helpful in the choice of such gears: Where the driving gear revolves around the aligned axis of the driven gear for purposes of joint control of the means to be controlled, the driving gear should ordinarily be larger than the driven gear. This rule has, for instance, been followed in the embodiment of Figs. 1 and 2.

But where the driver revolves around the aligned axes of the driven gears for purposes of complementary control, e. g. in an arrangement like that of Figs. 3 and 4, the driving pinion may be smaller than the driven gears.

Miter gear control yields an angle of 90° at the bottom of the triangle of Fig. 14. For a control within the range of an equilateral triangle the ratio of angular movement of the lever for joint control to that for complementary control is $\sqrt{3}$. Let us presume that the angular movements of the hot and cold water control stems yield corresponding flow and are directly proportional to the flow and the mixed discharge. In that case the aforementioned ratio of lever movement for corresponding joint and complementary control may be offset by inverse proportion in the transmission. In both instances, where bevel gears are used, the ratio between the large and small bevel gears should therefore be also substantially $\sqrt{3}$, e. g. they may have 26 and 15 teeth, respectively. Under such an arrangement gear 50 would have 26 teeth in the embodimen of Figs. 9–10, the larger gear being here the driver, as it is the case in the embodiment of Figs. 1–2. But in a bevel gear arrangement for the embodiments of Figs. 3–8 and 13 gear 50 would be the smaller, 15 tooth bevel pinion.

Still on the premise, that the movement of the control means to be coordinated by a device of this invention and the respective flow of fluid are directly proportional, and that the preferred manner of combined control provides a component along the base of an isosceles triangle for complementary control, whereas joint quantitative control is expressed by the distance of said base from the apex of the triangle, then the gear ratio for corresponding valve movement may be determined as a function of the desired angle L at the apex of the triangle (see Fig. 14), as follows:

$$\cotg. \frac{L}{2} = \frac{\text{transmission for complementary control}}{\text{transmission for joint quantitative control}}$$

In control means like the ordinary valve, where the control movement stops when the valve stem is seated, the shanks of angle L simultaneously delimit the closing of the control means and the movement of the control lever. But where there is elasticity in the transmission as suggested above, or in the case of control cocks, the control lever may have a larger range of movement which is preferably delimited by suitable stops. In the embodiment of Fig. 6 the manifold 101 checks movement of fingers 111 and 113, for instance, so that the movement of the cocks 99 and 100 is extended into a right angle set back from the right angle L defining the shut-off positions of the cocks.

Presuming that under a predetermined triangular range of adjustment the hot and cold water valves have reached their positions of greatest openings when the control lever is in the right and left top corner positions of Fig. 14, the combined valves will yield a corresponding full flow at any other positions of the lever along the base side of said triangle, although neither one of them is fully open. Thus both will only be half open at the center position, at line A. Therefore the lever may be moved beyond that base of the triangle, if so desired, or a suitable stop may be provided for, as we find it in several of the embodiments of the drawings. Thus slot 86 of the embodiment of Figs. 3 and 4 or the control inclined wall of the depression 147 of Figs. 9 and 10 represent checks for movement of the control lever, and those experienced in this art may provide similar stops for any other modification.

In connection with certain valves, particularly hot water valves, a slight angular change of the off-position may be expected during use, e. g. due to yielding of the valve seat. A shift thus caused in the off-position of the handle lever may be overcome by an angular adjustment of the transmission, by resetting, for instance arm 62 on hub 57 in connection with the hot water valve 65 of Figs. 3 and 4, or by resetting arm 163 on stem 155, 164 on stem 156, or both in the embodiment of Fig. 12. A relative shift of the points of mesh of gears, where gears are used in the transmission, will accomplish the same result.

In the embodiments of Figs. 15–18 the ratio of the square root of two is applied between the driven bevels $a1$ and the driving bevel $a2$. These embodiments further illustrate, that a control of this invention may be at random angularly displaced relatively to the fluid system served thereby. In applications like those of Figs. 3–8 and Fig. 13 it may for instance be awkward to provide for the clearance required to swing the control lever up as well as down. This may be overcome by placing the principal transmission axis at an incline as illustrated in the devices of Figs. 15 and 16, where the play of the control lever $a3$ ranges in an upward direction.

In that embodiment the hemispherical housing $a5$ arises at an incline to the rear from the base $a4$, and spout $a6$ extends from base $a4$ to the front. The spout $a6$ is supplied with fluid by a riser $a7$, which depends from base $a4$. By way of a T the hot and cold water supply lines $a8$ issue horizontally upon the bottom end of the riser $a7$ from opposite sides, each of these two lines being controlled by a valve $a9$. These valves are shown to be disposed at the same incline as the axis of the hemispherical housing $a5$ and are respectively subject to regulation by levers $b1$ and $b2$ on their stems. Control lever $b1$ is connected by a link $b3$ to the lever arm $b4$ mounted on tubular shaft $b5$ and in similar fashion the control lever $b2$ of the other valve $a9$ is connected by link $b6$ to a lever arm $b7$ mounted upon shaft $b8$.

Tubular shaft $b5$ is journalled in base $a4$, and extends centrally into the hemispherical housing $a5$. Hollow or tubular shaft $b5$ fixedly connects the lower driven or follower bevel $a1$ with lever arm $b4$. A lug $b9$ is journalled upon the upper end of shaft $b5$, above the said lower bevel $a1$.

Shaft $b8$ is rotatively accommodated in the hollow or tubular shaft $b5$ and fixedly connects the upper bevel $a1$ with the lever arm $b7$. The cylindrical shell $c2$, which is subject to control by handle $a3$, is fixedly connected with the bevel $a2$, and these two assembled parts are journalled upon a stud which extends on opposite sides from and forms part of the lug $b9$. Thus the shell and handle $c2$, $a3$ are universally mounted in housing $a5$ which may provide an inner rim $c3$, slidably fitting around shell $c2$.

If one of the valves $a9$ is a right hand and the other one is a left hand valve, any movement of lever $a3$ in a plane which contains the joint axis of shafts $b5$ and $b8$ will open valves $a9$ together, or it will close them together. But such valves will be oppositely controlled by any movement of lever $a3$ around said axis. Since the position in which handle $a3$ is shown in Fig. 15 is substantially that of farthest incline of said handle towards the front of the device, i. e. towards spout $a6$ there is ample space for manipulation of handle $a3$ through the assigned upward range, and even some other means, like a drain control, may be accommodated to the front of handle $a3$.

Such drain control is indicated by a short handle $c4$, which is fulcrumed by a pivot $c5$ upon base $a4$ back of spout $a6$. A drain control rod D is eccentrically hinged at $c6$ upon shaft $c5$, connects down to the drain plug below (not shown) by way of a clearance opening in the base $a4$, and is transversally offset on said base, so as not to interfere with riser $a7$ and its mounting. When handle $c4$ is oscillated rod D is raised and lowered.

As a further simplification it may be suggested that the control arms, like the lever arms $b4$ and $b7$ of the embodiment of Fig. 15, which connect the driven or follower bevels or miters by way of links with the valve control lever, be directly mounted upon or made part of the said bevels or miters. Such arrangement is illustrated by Figs. 17 and 18, where the driven or follower bevels $d1$ form part, e. g. as gear sectors, of the lever arms $d3$. The free ends of the lever arms $d3$ connect by links $d4$ in opposite directions to the valve levers $d5$. The valves $d6$ are not completely shown, but they are arranged on hot and cold water pipes, respectively, said pipes converging, for instance, by way of a T upon a riser $d7$ which in turn connects to spout $d8$. The arrangement of the piping is therefore similar to that shown in Fig. 15, except that the valve stems extend normal to the plane of the pipes and riser.

The housing $d9$ is sub-divided into two compartments. One of these compartments serves as spout $d8$ and riser $d7$ is extended downward therefrom. The other compartment $e1$ partly accommodates the gearing, is separated from the first compartment by partition $e2$, and has a circular opening $e3$ in its top, which serves as a socket for the spherical cap $e4$. Cap $e4$ has downwardly extending flaps $e6$. To one of these the driver bevel $d2$ is attached. Flaps $e6$ and driver $d2$ are collectively journalled upon pivots $e7$. These pivots $e7$ extend in opposite directions from a lug $e8$, around which the bevels $d1$ and bevel $d2$ are clustered.

Coaxially in opposite directions, thus forming a cross with the pivots $e7$, the studs $e9$ extend from the lug $e8$, the lug $e8$ being journalled by these studs $e9$ upon the housing $d9$. For such purpose a bracket $f1$, in which one of the studs $e9$ is journalled, is mounted upon the side of the hub $f2$ from which the riser $e7$ extends down. The bracket $f3$, in which the other stud is journalled, arises from a cross piece $f4$, which bottomwise bridges the housing $d9$.

Thus the units $d1$, $d3$ are rotatively accommodated upon the studs $e9$ between the lug $e8$ and the brackets $f1$ and $f3$. Cap $e4$ and its socket of opening $e3$ must of course be concentric with the point at which the axes of pivots $e7$ and studs $e9$ cross each other.

The housing $d9$ has a flange $f5$ by which it closes upon a supporting surface, for instance the top of a basin, around the opening, which must be provided in such a supporting surface to clear hub $f2$, cross piece $f4$ and the parts accommodated therebetween. Provided again, that the valves $d6$ controlled by a device of Figs. 17 and 18 are right and left hand valves, this device will function in analogy to previously described similar embodiments, e. g., that of Fig. 15; i. e., movement of handle $e5$ in a plane with the axis of studs $e9$ will open the valve together or will close them together, whereas the valve will be actuated in an opposite sense, when handle $e5$ is swung around the axis of studs $e9$.

Triple complementary control exemplified for three base colors

The embodiment of Figs. 19–22 illustrates a number of modifications, which may again, of course be applied and exchanged with features and elements illustrated in the other figures.

The gearing proper corresponds to that shown in connection with the other figures, excepting Figures 11 and 12, inasmuch as miters or bevels are clustered upon a lug or cross $e$. Rotating of the driver bevel $d$ is directly subject to control by the knob $k$. When knob $k$ is swung around the axis of bevel $d$, the follower bevels $f$ will be oppositely rotated by the rotation of driver bevel $d$. Whereas they will both be rotated in the same sense, when knob $k$ is swung around their common axis.

The embodiment of Figs. 19 to 22 particularly resembles Fig. 17 inasmuch as the follower bevels $f$ do not transmit their movement by shafts, but they are idlingly accommodated in this case, upon brackets $g$ and $h$ accommodating a mainshaft $a$. As a matter of fact this embodiment illustrates the case where the means to be controlled by the follower bevels are directly mounted on said bevels. The mainshaft $a$ is shown to be integral with the lug or cross $e$, and is journalled in brackets $g$ and $h$. Brackets $g$ and $h$ are mounted on opposite sides of a rectangular, open frame $i$, which may be suitably suspended, this embodiment being shown, as compared with most of the other figures, in an upside-down position for reasons hereinafter to be particularly explained.

Furthermore the control of the embodiment of Figs. 19 to 22 is, by way of modification, applied to another fluid, electricity. The particular electrical devices here controlled are rheostats, but it is understood by those versed in this art, that reactances may be controlled in the same manner, or that the instant control means may be applied in all instances where the improved and simplified regulation obtained thereby may prove to be of use. The three rheostats $c$, $s$ and $z$ shown comprise similarly insulatedly mounted resistor coils, each extended in a circle, each grounded at one end, e. g., by way of the metal part upon which it is mounted, to the frame $i$. Rheostats $c$, $s$ and $z$ are peripherally, outwardly exposed for contact with the respective brushes $b$, $r$ and $y$.

Trip (color) control

For purposes of explaining a particular instance of usefulness of the instant device the three rheostats $c$, $s$ and $z$ are to be connected into a circuit of an illuminating means, such as an electric bulb or lamp, respectively, the control of the light of each lamp being effected by oscillations of the respective rheostat ranging between an off-position and maximum intensity. Fig. 22 schematically indicates by dot-dash lines the rheostats $c$, $s$ and $z$ and the arrows interposed in the circles of these dot-dash lines indicate the sense in which these rheostats have to be rotated, i. e., in respect to the respective brushes $b$, $r$ and $y$, in order to permit the passage of more current, i. e. in order to turn on the respective lamp. For purposes of the instant control the rheostats should be designed in such fashion that the angular movement thereof is as much as possible in logarithmic ratio with the intensity of the light of the lamp controlled thereby. The three lamps controlled by the three rheostats should yield corresponding intensities of the three primary colors and the lamps controlled by the rheostats $c$, $s$ and $z$ will therefore hereinafter be called blue, red and yellow, so that by a complete and relatively coordinated control of the intensities of these three lamps theoretically every possible shade of color can be produced.

Rheostats $c$ and $s$ are mounted upon the two follower or driven gears $f$, which are shown to be rotatively journalled upon hubs extending towards each other from brackets $g$ and $h$. The third rheostat $z$ should be fixedly mounted upon the mainshaft $a$, but for purposes of a better mechanical arrangement it is equivalently shown to idle upon the shoulder of a hub of bracket $h$, and a pin $j$ extending out from shaft $a$ through a circular slot in said shoulder of the hub of bracket $h$ in to the bush of said rheostat $z$ establishes the desired fixed rotative relationship between shaft $a$ and rheostat $z$.

Presuming, for the time being, that the brushes $b$, $r$ and $y$ are fixedly allocated, we recognize by comparison of the diagram of Fig. 21 with that of Fig. 14 and by drawing a parallel between the red and blue lamp with the cold and hot water supply that by oscillation of knob $k$ in the plane of the axis of shaft $a$ we may turn off the red light and fully turn on the blue light by swinging in one direction, and may turn off the blue light and fully turn on the red light by swinging in the opposite direction, the intensities of the respective lamps changing during these movements in complementary manner. We may, therefore, obtain any desired combination between red and blue by swinging knob $k$ in the plane of the axis of shaft $a$. After any desired combination of red and blue has thus been obtained, the combined intensity of that particular red-blue color mixture may then be changed ad libitum by swinging knob $k$ around said axis of shaft $a$ the ratio between red and blue remaining, however, the same. By thus swinging knob $k$ in a plane normal to shaft $a$ both lights may be turned off. But in the direction in which red and blue are turned off by swinging knob $k$ in a plane normal to shaft $a$, the yellow light is turned on, because the respective rheostat $z$ rotates with shaft $a$. Or, if the shaft $a$ is turned as far as possible in the opposite direction, the yellow light will be turned off. If knob $k$ is moved in a plane with the axis of shaft $a$ there will be only a complementary control of the red and blue lamps. Correspondingly, bearing shaft to the right, the red lamp will be turned off and by moving along a line where the red light remains turned off we may effect any desired combination between the blue and yellow lamps. Finally, bearing sharply to the left, so that the blue light is turned off, any possible combination between the red and yellow lights may be effected. Within the solid angle circumscribed by the three movements just described, any possible red-yellow-blue variegation may be effected. Therefore a device of this embodiment offers a simple control for producing all possible color combinations, provided, of course, that lamps are available, which truly represent the three primary colors.

In that case, each position of knob $k$ within the range just referred to, i. e. the range extending over the combined full control ranges of the three rheostats $c$, $s$ and $z$ corresponds once and for all to a fixed shade of color yielded by the mixed and combined light of the three lamps of primary colors, and a position for any possible combination between the three lamps or their colors is available within said range. Thus a chart may be prepared in connection with the device of Fig. 19, which assigns each possible shade of color to a particular angular position of knob $k$, as it may be defined by the component angular positions of said knob referred to each of the two coordinates represented by the axes around which lug or cross $e$ is swingable. Thus the outer end of the arbor $l$ of knob $k$—and that end might be pointed for such purpose—will describe and travel over a concave surface which is concentric with the point at which knob $k$ is universally hinged, i. e. the crossing point of the axes of lug or cross $e$. If such a spherical concave is actually provided we may map out and tabulate thereon the composite color obtained, when arbor $l$ points in the respective direction.

The device so far described offers a full complementary control for the rheostats $c$, $s$ and $z$, i. e. knob $k$ may be swung into the position of any possible ratio between the current and color values of the blue, red and yellow lamps. Generally speaking, a device is here offered, by which three separate controls may be placed into any possible relationship. But it may also be desirable, after a certain triple ratio, e. g. for particular shade of color, has been set by a device of Fig. 19, to regulate the combined intensity, e. g. of light at which such shade of color is produced, the ratio, at which the three lamps contribute to such shade of color, remaining the same. This might be effected for instance by moving knob $k$ in or out, without changing its angular position. Such movement of the knob may be transmitted to another rheostat, which in series controls the three light circuits. The drawing illustrates an alternative, a combined control of all three rheostats $c$, $s$ and $z$ by reciprocation of knob $k$ axially along the arbor $l$, as follows:

Various ways may be devised for transmitting a reciprocating movement of the universally swingable knob $k$ for similar reciprocations or corresponding rotation of parts relatively to the fixed elements of the device. For reasons of simplicity a pinion and rod movement is selected, which entails a minute inaccuracy, because it will be slightly affected by the revolving of lever of knob $k$ in the plane of shaft $a$, but that inaccuracy may be rendered negligible by the use of comparatively small pinions.

The arms extending on cross $e$ in opposite directions from shaft $a$ are cut down at their ends to form circular shoulders $n$. These shoulders, respectively, rotatably accommodate the driver bevel $d$ and a slide box $o$. Fig. 19 shows the latter to be endwise open. Driver bevel $d$ and slide box $o$ are fixedly interconnected by the two spacing lugs $p$. One of these spacing lugs $p$ carries arbor $l$ of knob $k$, the axis of such arbor $l$ extending through the center of cross $e$, so that arbor $l$ extends in a common plane with the axis of shaft $a$ as well as in a common plane with the axis of circular shoulders $n$. Strictly speaking it is therefore this arbor $l$ which corresponds to the control handles of the embodiments of the other figures.

A pinion $q$ is rotatably accommodated in cross $e$ along the axis of the shoulders $n$ and passes the center of the cross at the inner end, whereas it projects at its other end through slide box $o$.

An offset bracket $k1$ forms part of knob $k$ and extends from a straight shoulder $k2$ of said knob to one side thereof, as a slotted extension $k3$. This slotted extension $k3$ extends in parallelism with the bore of knob $k$, which rides an arbor $l$, and is slidably accommodated in that parallel direction in the slide box $o$. One inner, longitudinal side of the slot of slotted extension $k3$ is provided with rack teeth $k4$, and this rack formation is in mesh with the end of pinion $q$, which extends into the slide box $o$. Pinion $q$ will therefore be oscillated when knob $k$ is reciprocated on arbor $l$, and such reciprocation is transmitted by a rack $k5$ to the cylindrical lugs $k6$, which are slidably accommodated in extensions $g1$ and $h1$ of brackets $g$ and $h$, i. e. in the bores, which also support the opposite ends of shaft $a$.

The rack $k5$ is longitudinally slidably accommodated in a feather keyway of shaft $a$ and remains in mesh with the pinion $q$ when reciprocated. The opposite ends of rack $k5$ are fixedly attached to or form part of the cylindrical lugs $k6$. A pair of cylindrical cam lugs $k8$ is rotatably mounted by way of shoulder screws $k7$ upon the outer ends of cylindrical lugs $k6$. Lugs $k8$ also slidably fit in the bores of extensions $g1$ and $h1$, and forcedly participate in the reciprocations of cylindrical lugs $k6$, but not in the rotation forcedly imparted to cylindrical lugs $k6$ by any rotating movement of cross $e$ around the axis of shaft $a$.

Studs $g2$ and $h2$ extend from the cylindrical surfaces of lugs $k8$ and carry rollers $g3$ and $h3$, respectively. Rollers $g3$ and $h3$ are engaged in and guided by oppositely twisted helical slots in the extensions $g1$ and $h1$. Such arrangement determines, therefore, the angular positions of the cylindrical cam lugs $k8$, said lugs being rotated in opposite, angular ratio with the reciprocation of rack $k5$, i. e. with the reciprocating movement imparted to knob $k$.

The ends of extensions $g1$ and $h1$ are closed by screw caps $g5$ and $h5$. Between these caps and the brackets $g$ and $h$ the extensions $g1$ and $h1$ rotatably accommodate the brush holder brackets $t$ and $v$. Rotation of these brackets upon the extensions $g1$ and $h1$ is however checked by the rollers $g3$ and $h3$, respectively, said rollers extending into the straight feather-keyways $p1$ and $v1$ in the bores of said brackets $t$ and $v$, respectively. Thus the brush holder brackets $t$ and $v$ are swung in opposite directions but through like angles by reciprocation of the knob $k$.

Each one of said brush holder brackets $t$ and $v$ is paired with another bracket $u$ or $w$, respectively. Brackets $u$ and $w$ are rotatably accommodated upon inner extensions of the brackets $h$ and $g$, respectively. The brush holder brackets of each of the pairs $t$ and $u$, and $v$ and $w$ are respectively interconnected by the brush holders $x$. The holder unit $t$, $u$, $x$ carries the brushes $b$ and $r$, and the brush holder unit $v$, $w$, $x$ carries the brush $y$. Normally the pressure of compression spring $k9$, which is accommodated on arbor $l$ and reacts between one of the spacing lugs $p$ and the shoulders $k2$ of knob $k$, pushes knob $k$ as far out on arbor $l$ as possible, i. e. as the caps $g5$ and $h5$ and the shaft $a$, which act as checks for lugs $k8$ and $k9$, will permit. In that case the brush holders $x$ are swung as far away as possible from the base $i$ in directions opposite to the arrows shown in connection with such brush holders in Fig. 22. Knob $k$ is shown in such a released position in Fig. 20, at which position little, if any current will be passed by the rheostats.

But when the knob $k$ is pushed down and spring $k9$ is substantially fully compressed, as shown in Fig. 19, the brush holders $x$ are in the position of Fig. 22, i. e. in a position at which the respective rheostats permit maximum passage of current for the lighting of the lamps, disregarding the respective individual positions of said rheostats.

Reciprocation of knob $k$ will therefore control rheostats $c$, $s$ and $z$ in the same sense, whereas a swinging of knob $k$ around the center of cross or lug $e$ will permit complementary control of the rheostats for establishing any triple current ratio desired.

*Field of adaptation of triple and double control*

Disregarding the additional control offered by the reciprocating knob, a device of Figs. 19–21 offers, generally speaking, a fully complementary control of the flow of three fluids in relation to each other, or a similar control for three movements, or a threefold mixture of both. Once a preferred relationship of the three media has been established, they may be jointly controlled at that ratio or in a correlated, predetermined order. A number of uses suggest themselves for such a control means, the party experienced in the field of desired application being able to apply it by mechanical skill. In the control of an airplane, to cite an example, the control means for the speed of the motor, the blast of the supercharger and the pitch of the propeller may be controlled like the rheostats $c$, $s$ and $z$, i. e. the instant device permits relative adjustment and joint control.

As to the number of flows or movements that may thus be fully controlled by a device of this invention three represents the upper numerical limit. However more fluids or movements may be controlled, if it is not a prerequisite that each flow or movement be controlled in respect to any other flow or movement.

Two motors may, for instance, each be fully controlled by a device of my invention as to movement in a forward and in a reverse direction, because there can be only control concerning either the forward or reverse movement of each individual motor at one time; or rather, if increased speed of rotation of a motor in one direction is to be considered in the sense of decreased speed of rotation of that motor in the opposite direction, then there will, of course, always be a complementary action between the forward and the reverse movements.

Let, for instance, each one of the two followers of a device of my invention be coupled to the mainshaft of the known type of controller for reversible motors, as they may be used in trolley cars or cranes, or in connection with the motors of trains. Then the starting point, from which the controller shaft is rotated in opposite directions in order to rotate the motor in opposite directions, will be arranged to register with a central point of each follower. If the arrangement is such, that both controlled motors move forward when the handle of my device is moved up, then both motors will rotate in an opposite reverse direction, when the handle is shifted vertically down. One motor will turn frontward and the other one in an opposite sense, if the handle of my device is shifted to the left. Both of these rotations are the converse when the handle of my control device is moved to the right. If the driver and follower gears of my device are miter gears, and the motors and their controllers are symmetrically arranged concerning rotation and control action in opposite directions, then the motors will always rotate at like speed, when the handle is moved along rectangularly disposed ordinates, except that the motors will rotate in the same direction during movement of the handle along one ordinate, e. g. the abscissa, and will rotate at the same speed but in opposite directions when the handle is moved along the ordinate. When the handle is moved along one of the diagonals, i. e. at 45° relatively to the ordinates, one of the motors will stand still, whereas the other motor may be controlled throughout the full range of forward and reverse movement. The converse takes place if the handle is moved along the other diagonal. If we then turn the control device of my invention through 45°, the arrangement will correspond with the showing of Fig. 22a. The legends "Vertical shaft" and "Horizontal shaft" refer to the principal axes of my control device, after it has been turned through 45°. The new ordinates are lines of principal orientation concerning the movement of the first and second motor, respectively. The letter F and R indicate the direction of exclusive movement of each motor, respectively, representing "forward" or "reverse," respectively. It is very easy for an inexperienced operator to orient himself concerning the control exercised by such a device. In connection with a crane, where for instance one motor serves for longitudinal movement, another one for transverse movement, a third one for vertical movement and the fourth one for the gripping and releasing action, the first two motors may for instance be controlled by one of my devices, the other two motors by another device of my invention, and, using one of his hands for the control of each one of these devices, the operator may have all four motors under continuous and full control for movement of each one in opposite directions.

Or such a device of my invention may be useful for the control of the twin screws of a vessel, each one of the two follower gears of the device being connected for the control of one of the screws or propellers. Such arrangement facilitates navigating by the control of the screws or propellers only.

Tab control

But there may also be instances where the device of this invention is to be used to move a heavy apparatus into any desired position, yet the actual moving is to be effected by a motor, because it would represent too much of a physical effort for the operator. In such a case a device of my invention serves for direction only, and auxiliary, e. g. motor driven means serve to swing the controlled apparatus into the desired position forthwith. By way of example Figs. 22 to 25 illustrated a control device for the tabs of heavy aircraft:

According to present day practice the right and left tabs of a plane usually have independent controls, although, for purposes of economy of space, such independent controls are superimposed upon each other upon a single control device. Converting the device of the instant invention for controlling the right and left tab offers the following advantages:

1. There is a single control handle for both tabs.
2. The joint control is compact and requires little space in the operating room.
3. The joint control of the two tabs may be carried out in such fashion, that there may be an adjustment leveling the airplane endwise, i. e. tilting the nose up or down, without causing the ship to list, or without affecting any adjustment which might have previously been made concerning a list of the ship. On the other hand an adjustment is provided for putting the ship transversely onto an even keel, without affecting any adjustment which might have been made before because the ship was nose or tail heavy.

The foregoing points apply to a direct control, but if the control is to be made indirectly, i. e. the joint control serves to regulate hydraulic, pneumatic or electric means turning the tabs.

4. We may provide for a check on the joint control device indicating whether and how the direct movements of the tabs have been executed by way of the interposed power means.

The double control device of Figs. 23 to 25 has a globular housing 201 which is split lengthwise at 202 and has an extension 203 down and to the rear. That extension 203 has an intermediate flange 204, by way of which the device may be mounted upon a wall or panel.

Opposite each other and in axial alignment the upper follower miter gear 205 and the lower follower miter gear 207 are rotatably mounted by way of ball bearings 206, 208 upon the inside of the globular housing, at the top near the bottom thereof, respectively.

A false bottom 209 is made part of the extension 203 of the housing. From such false bottom 209 the arbor 210 arises vertically and centrally in the globular housing 201. Arbor 210 is shown to be clamped onto the false bottom 209. Upon arbor 210 the forked lug 211 is swingably mounted. In that lug, in turn, the transverse portion 212 of the handle arm 213 is journalled. Nuts 214 provide against end play of said portion 212 in lug 211 in one direction, and in the other direction the miter gear 215 is mounted by a set screw 216 upon said portion 212 and rotatably abuts against the outer face of lug 211.

To the front the spherical dial 217 is superimposed upon the globular housing 201. That dial may be provided with a rough surface in order to permit the point 218 to engage at any location thereon, the side view of Fig. 25 showing identations 219 for such purpose. If the dial is to be illuminated from the inside, or a luminous pointer is to play over the inner surface thereof as it is the case in the embodiment shown, then it may be made of translucent or transparent material.

Globular housing 201 has a slot 220 along a largest diameter thereof. That slot extends normal to the main axis of arbor 210, slidably accommodates the portion 212 of the handle arm 213, and preferably extends over a quadrant or more, depending on the range through which the handle arm 213 is to be swung in a horizontal plane.

Outside of the globular housing 201 the handle arm 213 is swerved to the front of the device, where it carries a T formation 221. T 221 radially reciprocably accommodates a stud 223 which carries at one end the pointer 218. A compressed spring 224 reacts between the pointer 218 and T 221 and normally presses the pointer onto the dial 217, the pointer extending into an indentation 219, so that the handle arm 213 and the axes of driver and follower gearing are temporarily in a fixed position. But a handle arm 222 mounted upon the back of stud 223 permits the pointer 218 to be manually withdrawn out of the indentation in which it is engaged, whereupon said pointer may be shifted to any other position on the dial, where it is released and engages in another indentation. If the pointer 218 is shifted in a horizontal plane, lug 211 is swung around arbor 210, but the relative position of the driver and follower gears is not changed. If the pointer 218 is shifted in a plane normal to the portion 212 of handle arm 213, lug 211 is not revolved, but the driver 215 rotates the followers 205 and 207 in opposite directions.

For a direct control the parts to be controlled, e. g. the tabs of an aeroplane, are operatively connected with the followers 205 and 207, e. g. by flexible shafting. Such a multiple, remote, direct transmitting mechanism finds manifold applications, e. g. in high frequency or ratio control. But the particular embodiment shown in Figs. 23 to 25 is intended to illustrate an indirect, complementary control of two separate parts, e. g. two tabs. For such purpose Fig. 23 shows each of the tabs 225 and 226 to be coupled with a motive means, e. g. an electric motor 227 and 228, respectively, and these motors are controlled by the followers 205 and 207 in order to place the tabs 225 and 226 into positions which correspond exactly to positions they would assume if directly coupled to such followers, such positions being determined by the allocation of pointer 218 upon dial 217.

For such purpose and in order also to offer means at the double control device which serve for ascertaining the actual position of the tabs 225 and 226, before, during and after movement, a second driver and follower set is accommodated in the device, which is slightly smaller than the first set 215, 205 and 207 in order to fit into the space circumscribed by said first set of miter gears.

The second driver 231 idles upon a pivot 229 between a collar 230 and a hub 234, said pivot 229 and hub 234 extending upon one side from a second lug 235. Said second lug 235 is hinged upon arbor 210 between the ends of the forked lug 211. While in a normal and average position of the device, pivot 229 extends substantially opposite to the portion 212 of the handle arm 213, it is shown in Fig. 24 to be swung about 22½° to the front of the plane of the drawing and the second driver 231 is there shown to be swung through a like angle of about 22½° down from its normal or average position.

The second driver or miter gear 231 carries an indicator, e. g. a conduit with a tiny incandescent or luminescent bulb at its end. That indicator is, at a normal and average position of said second driver or gear, trained upon the center of the spherical dial 217, and it points, therefore, in the position of the driver or gear 231 just described to a corresponding position on the dial, which, in the calibrations of the said dial, is about 45 down and 45 to the right. The drawing shows such an indicator by way of a rod 236 extending out from the backside of the second driver or gear 231 to a point close to the inside of the globular housing 201, and from there peripherally to the point to be indicated, being bent up at its very end into close proximity with the spherical dial 217, and that end is coated with a luminescent paint 207, e. g. that paint 207 luminesces characteristically under the illumination provided for the dial, and will thus indicate upon the dial the position of the second driver or gear 231 analogous to the manner in which pointer 218 indicates upon the dial 217 a predetermined position of the first driver or gear 215.

The second upper follower gear 232 has a sleeve extension 238, by which it is journalled in said arbor 210. At its lower end and in rotatable abutment against the bottom face of arbor 210 the sleeve extension 238 carries one of a pair of meshing miter pinions 239. The second one of these pinions 239 is mounted upon a horizontal shaft 240, which extends to the rear in the downward extension 203 of the globular housing 201. There the shaft 240 is operatively connected by a similar pair of meshing pinions to the flexible shaft 241. That flexible shaft connects to the shaft 242 of the tab 226, Fig. 23 showing these two shafts to be driven by a motor 228. The electric wires 243, which serve to control the rotation of motor 227 in one or the other direction, extend back into the globular housing 201, and there, by way of sleeve extension 238, to a multiple pole, double throw reversing switch 244, which is mounted on the second upper follower 232. Switch 244 has a forked control lever 245, which is in a vertical position when the switch is open, whereas it will connect motor 227 for rotation in one or the other direction, when it is turned from such upright position in a clockwise or counterclockwise direction, respectively. When switch 244 is in a closed position, e. g. in a position like that shown in Fig. 24 of the drawing, pin 246, which is mounted upon the inside of the first follower gear 205, registers horizontally with the space between the forked ends of lever 245. Since the motor 227 rotates at this time in a direction which rotates the second upper follower 232 in clockwise direction when seen from the top, pin 246 will eventually enter between the forked ends of lever 245 and will swing the lever 245 into a vertical position in which the switch of the motor 227 is shut off and the two upper follower gears 205 and 232 are then in the normal, registering position. Gear 232 is now at rest. But if gear 205 is rotated now by manipulation of ball 222, pin 236 will throw lever 245 in one or the other direction into a closed position in which the motor 227 rotates and imparts to gear 232 a movement following the movement which had previously been imparted to gear 205 by manipulation of handle 222. When gear 232 has been driven by the motor through the same angle through which the gear 205 has been manually swung, gears 232 and 205 register again, and lever 245 has been swung in the position, in which the motor 227 is shut off.

The second lower follower gear 233 is shown to be integral with one of a pair of miter pinions 247, this gear unit being journalled upon arbor 210 on top of the false bottom 209. The second pinion 247 extends through a clearance 248 in the false bottom 209 into mesh with the first miter pinion 247 and has a sleeve extension 249 which is concentric with the shaft 240. The unit 239, 240 is journalled by one of the ball bearings 250 in the unit 247, 249 and the latter is journalled by the other ball bearing in a bracket 251 depending from the false bottom 209. By a similar pair of pinions (not shown) the sleeve extension 249 is connected at its rear end in the extension 203 of the globular housing 241 with the flexible shaft 252 issuing to the right from said extension 203. Flexible shaft 252 and the shaft 253 of tab 226 are connected with each other and with motor 228. The wiring 254 serving for the control of the motor 228 for rotation in opposite directions connects back into the globular housing 201 to a multiple pole, double throw reversing switch 255. That multiple pole, double throw reversing switch 255 is mounted upon the first lower follower gear 207 and its forked switch lever 256 is in operative relationship with a pinion 257 depending from the bottom side of the second lower follower gear 233 in a manner corresponding to that previously described in connection with parts 244 to 246. Switch lever 256 extends radially in respect to the axis of arbor 210 when the switch is in an open position. In either one of the closed positions of the switch the space between the forked ends of the lever 256 is in levelled alignment normally to the said axis with the pin 257.

When switch 255 is in an open position and its switch lever 256 extends radially towards the axis of the device, pin 257 is accommodated in the forked lever and the two registering gears 207 and 233 are at a standstill. If now, by operation of the manual control 222, gear 207 is swung away from a position at which it registered with gear 233, switch 255 will be closed, motor 28 will rotate tab 226 and gear 233, the latter gear so that it will follow the gear 207 until it catches up with it, and the motor will come to a standstill as soon as gears 233 and 207 register again. Gear 205 will thus register with gear 232, and gear 207 with gear 233, when pointer 218 registers with the luminescent end of indicator 236. When by manual operation the pointer 218 is moved away from such a registering position, one or both the motors 227 and 228 will operate and will rotate one or both of the second follower gears, to the extent to which the first follower gears had been shifted by such moving. Thus the indicator 236 will follow the pointer 218 to its new position, until the two pairs of the first and second followers as well as the indicator 236 and the pointer 218 are again in registering positions.

Let us presume that there is a gear ratio 1:2 between the second followers and the respective tabs. It had been explained above, that for the second driver 231 a position has been chosen for the drawing, in which it is turned down 22½° from its normal position on its own axis and turned to the right for 22½° from the normal position of its shaft 229 relatively to the main axis of arbor 210, so that indicator 236 points to the position 45, 45 in the right lower quadrant of the dial. For this position of the indicator 236 the 45° movements down and to the right, as indicated on the dial, have compounded and added to each other to swing the tab 226 into a vertical position down, i. e. 90° away from a normal, level position. Tab 225 is, on the other hand, in its normal, level position.

The respective movements may best be checked from Fig. 22a, if we imagine that diagram to be rotated through 45° in a counterclockwise direction, so that the "vertical shaft" is actually vertically disposed and the "horizontal shaft" is horizontally disposed in the drawing. Then motor 228 is the "first" motor and motor 227 is the "second" motor. For the instant purposes the letters F and R then stand for "up" and "down" as to the tabs. Accordingly the first motor 228 has swung the tab 226 into the down position of Fig. 23, when the 45, 45 position is indicated on the dial in the lower right hand corner, whereas the second motor 227 is near its normal, center position and the tab 225 is substantially in its normal, level position. But the operator has swung the pointer 218 to a point 85 latitude and 15 longitude in the lower left quadrant; which means, that the first motor 228 will be reversed and the tab 226 will swing slightly up, whereas the tab 225 will swing considerably down until indicator 236 has swung into a position in which it registers with the pointer 218. For some uses it may therefore be preferable to arrange the coordinates of the calibration of the dial in diagonal directions.

It will be noted that in connection with the particular embodiment of the drawings the pointer 218 will not describe largest circles in its vertical movements, but a circle of the diameter of a sector taken about 10 degrees to the left from the center. Such arrangement has been resorted to because the slot 220 must terminate, at the front, short of the dial 217.

Generally speaking the longitudinal and latitudinal graduations of the dial are of particular advantage for making adjustments when a plane is nose heavy or tail heavy, without affecting the transverse balance of the plane—by following a longitudinal graduation of the dial. Or we may adjust for a list of the plane without impairing, in the converse, the longitudinal balance of the plane—by following a latitude. During a longitudinal or vertical movement of the control lever the tabs are swung up or down together, the angle, if any, between them remaining the same. During any latitudinal movement, on the other hand, the one tab will move in one direction to exactly the same extent to which the other tab moves in the opposite direction, so that the average incline of both tabs remains the same.

So far a complementary control of two components, concurrent and opposite to each other, has been shown and described as one of the important features of this invention. If the complementary feature is not of the essence, one of the follower gears or elements may be omitted, and its place may be taken, as an element by which movement is to be transmitted, by the head or lug (e. g. lug 211 in the embodiment of Figs. 23 to 25) which supports the driver gear or element. The concentric pair of shafts connects, therefore, from one follower and from said head or lug to a remote point of control or a remote point where movement is to be controlled. Whether the upper or the lower follower will be used, depends on the desired relative sense of rotation, and normally that determines also, whether the outer or inner shaft connects to the head or lug. That may be better understood from the following illustrations, of which the embodiment shown in Fig. 26 preserves the indirect control and checking feature of the embodiment of Figs. 23 to 25.

Theodolite

The directed movements and the manner in which they are trailed is checked in the embodiment of Fig. 26 by concentrically arranged measuring scales which refer to one common pointer. A theodolite offers an ideal application for such a modification, the theodolite serving, for instance, to control a device which is to move in predetermined relationship to the movement of the theodolite. Such devices may for instance be a gun, a searchlight, etc. Such a device is trained as to azimuth and elevation by two motors. A pair of electrical control means for the motors are accommodated in the theodolite, and these control means are connected to control azimuth and elevation by rotating motors in one or the opposite direction or by bringing them to a stop. The theodolite of Fig. 26 further shows means for observing, right on the scale of the theodolite, to which extent the movements of a device such as a gun or a searchlight have trailed the movement directed by the theodolite.

Fig. 26 shows, in the customary fashion, a turntable 1A. Along the axis of said turntable the outer end 1B of a telescope is fulcrumed to rotate around a horizontal axis. Thus a tubular portion 1C connects the outer portion 1B with the relatively offset eye-piece 1D and said connecting tube portion 1C is journalled in a bracket 1E arising from the turntable 1A. But instead of a disc with a gradulated rim, which is ordinarily mounted upon the axis of the telescope of a theodolite and serves for indicating elevation, a bevel gear, and more particularly the miter gear sector 1F is mounted upon the connecting tube portion 1C and meshes with the miter gear 1G, so that the swinging in a vertical plane is converted into a rotation in a horizontal plane. Miter gear 1G is journalled upon the upper end of the vertical arbor 1H, which is one of the stationary parts. The other stationary parts are a plate 1J, from which depends an arbor 1K in concentricity with the arbor 1H, the housing 1Q which is covered by the plate 1J, a bracket 1N depending from the plate 1J and serving to support the end of the transmitter shaft 1L, and a hub 1P in the housing 1Q which serves to journal the end of the transmitter sleeve 1M in concentricity with the transmitter shaft 1L. Turntable 1A rests on top of arbor 1H and is journalled in the arbors 1H and 1K by the sleeve 1R depending down from the turntable through said arbors.

From miter gear 1G extends down a skirt 1S as a top conical dial, which is graduated for elevation, the marking being identified by the legend "Vertical sight." A second conical dial 1T is circumferentially aligned with the first dial 1S, is journalled upon the vertical arbor 1H right below the miter gear 1G, and is shown to be integral with the bevel gear 1X, which is in mesh with the bevel pinion 1Y mounted upon the transmitter shaft 1L.

A third conical dial IV is circumferentially journalled upon the stationary plate IJ and also carries a bevel gear IZ which is in mesh with the bevel pinion 2A mounted upon the transmitter sleeve IM. Dials IT and IV register the elevation and azimuth as transmitted back to the theodolite from the device directed thereby, and are accordingly connoted by the legends "Vertical trailed" and "Horizontal trailed," respectively.

The fourth conical dial IV is a circumferential part of the plate IJ and is stationary therewith. It has a projecting circular rim IW, on which slides the bottom side of a frame 2B extending over the four dials down from the rim of the turntable IA. The stationary dial IV has an azimuth graduation similar to the rotatable dial IU and is connoted by the legend "Horizontal sight."

Dial IS normally registers with dial IT and dial IU with dial IV. These dials respectively register, when the controlled device is in a zero position correspondly to that of the theodolite. The graduations of all the dials may be read in relation to a reference line, the drawing showing for such purpose, for instance, a vertical line 2C on the transparent window 2D mounted in frame 2B, such line being stationary relatively to the turntable IA.

It is to be observed, that if related to an absolute, stationary scale, the top conical dial IS registers the elevation in addition to the azimuth. That must be taken into account when dials IT and IU are synchronized by way of any of the means known to those acquainted in this art, e. g. by way of sleeve IM and shaft IL extending to the controlled device, in order to register in the elevation and azimuth thereof.

When the theodolite of Fig. 26 and the device controlled thereby are in corresponding position, dial IS registers with dial IT and dial IU registers with dial IV. When the telescope of the theodolite is swung into a new position, the registering alignment of the dials is disturbed and will only be restored after dials IT and IU have been swung to follow the dial IS and line 2C into their new positions, which means that the controlled device has been oriented to correspond with the new position of the theodolite. This is effected as follows:

The wiring 2E serves to regulate the start, stop and reversing of the motor (not shown) which operates the controlled device for elevation. Wire 2F similarly serves the motor which operates the controlled device for azimuth. Wiring 2E leads to a switch 2G which has a normal, central, neutral or open position. It closes the motor circuit for operation when thrown in opposite directions, i. e. when switch lever 2H is swung in one or the other direction from said neutral, open position. Switch 2G is mounted on gear and dial IG, IS and is shown in a closed position, in which the forked ends of lever 2H will receive the actuator pin 2J mounted on dial IT, when dials IS and IT are swung into a registering position. As those dials swing into such a position, the actuator 2J swings the forked lever 2H into a position in which switch 2G is open, that open position of the switch corresponding to a registering position of dials IS and IT. But when, by newly setting the theodolite, dial IS is swung out of a position in which it registers with dial IT actuator 2J will close the switch causing the motor controlled thereby to turn in the direction which revolves dial IT into a position in which it again registers with dial IS. As soon as it so registers, the switch stops the respective motor.

Analogously the wiring 2F connects with a reversing switch 2K, which is mounted upon an arm 2L and has a forked lever 2M. Lever 2M is operatively disposed relatively to an actuator pin 2P mounted upon a bracket 2N. Arm 2L is mounted upon the lower end of the sleeve IR of the turntable IA, and rotates therewith. Bracket 2N is journalled upon arbor IK but is fixedly connected with the dial IU, e. g. by a connecting rod 2Q extending through a suitable clearance opening in the plate IJ. Dials IU and IV are provided with like calibrations but in opposite direction in a circular sense. Reference line 2C shows on dial IV the horizontal angle, e. g. azimuth, at which the theodolite is directed. The zero point of dial IV shows on the scale of dial IU, how the controlled device is directed, i. e. the azimuth of that device. When the zero point of the gradduations of the dial IU registers with reference line 2C, the zero point of dial IV registers with the same reading of the graduations of dial IU as the reading of dial IV upon which the reference line 2C has been set. That is a position of rest at which the theodolite and the controlled device register with each other as to azimuth.

Corresponding to the operation of the switch 2G the circuit of switch 2K will be closed when the reference line 2C is moved from the zero mark of dial IU, and the respective motor will be actuated to swing dial IU until the zero point of that dial is again aligned with reference line 2C; then the respective motor comes to a stop.

Thus the position of elevation and azimuth of the theodolite as well as of the controlled device may be learned at any time from the four dials IS, IT, IU and IV in their relationship to the reference line 2C, and any manual operation of the theodolite will be followed forthwith by an automatic orienting of the control device in a corresponding direction. If it should be desired, on the other hand, that the control device will not at all times hunt the theodolite in its new orientation, but only when the operator has reached a final setting of the theodolite to which the controlled device is to be swung, then a master switch is provided on the theodolite through which he controls the circuit of wiring 2E as well as of 2F. When that master switch is turned off, the theodolite may be operated, but the control device will not follow its movement. But the controlled device will swing forthwith into a position corresponding to that to which the theodolite has been set, when the master switch is turned on. Such a master switch is indicated at 2R in the drawing, and it is within the knowledge of those acquainted in the electrical arts to connect such a switch so that it controls the circuit of wiring 2E and 2F. But it is not shown so to be connected, in order not to impair the perspicuity of the drawing.

A control device of my invention may be put to good use in connection with telescopes, periscopes or other optical devices. In that case the concentric control shafts may for instance be tubes converted for an optical duct, and a joint or differential movement of such tubes serves to control from one end thereof a directional or sight element at their other end at any preferred inclination or declination within a solid angle of 180° or more.

It had already been shown in connection with the luminous trailing means 237 of the device of Figs. 23 to 25, that the previously described arrangements of this invention, in which the movement of a lever swinging through a solid angle may be transmitted by way of concentric shafts one surrounding the other, may be reversed, i. e. the swinging of any lever, pointer or directional element through a solid angle may be controlled from a remote point by component, rotatable elements, e. g. a pair of shafts, one of which surrounds the other. Such a reversed arrangement may be converted for many uses, such as spraying, sighting, projecting, pointing etc. by an element at a remote point, and to such an element the control movement is transmitted by a pair of shafts which are journalled for rotation of one of said shafts inside of or around another end for rotation of all the shafts together. The following are specific illustrations of such arrangement, which also show, that the concentric shafts, if both made hollow, may serve as a duct.

*Periscope control*

Periscopes are ordinarily equipped for a panoramic view, i. e. a level sight opening may be swung in all directions around the axis of a substantially vertical optical duct to scan a zone of a height, corresponding to the angle of sight of the periscope. This invention offers a universal sight, i. e. all of the solid angle above the said zone and a portion below are included within the range of the periscope.

An outer tube 3A and an inner tube 3B serve as the riser and connecting optical duct of the periscope. They are concentrically and relatively rotatably retained by the ball bearings 3C. The combined tubes 3A and 3B are reciprocatably and rotatably mounted in a support in order to allow, in the customary manner, a raising and lowering of the periscope and rotation thereof for purposes of a panoramic view. As primitive means for that purpose, e. g. for a marine or submarine application, Fig. 27 indicates a packing 3D in the wall 3E of a vessel, which sealedly accommodates the outer tube 3A, permitting it however to be raised, lowered and rotated. For suspending the periscope in a predetermined, elevated position, a ball thrust is indicated. The upper flange 3F is affixed to the outer tube 3A. The lower flange 3G is rotatable, is thrustwise confined by a supported flange 3H forming part of the outer tube 3A, and has a skirted rim which is rotatably supported by hooks 3J depending from the wall 3E. Handle 3K offers a means for manipulating the periscope, i. e. raising and lowering it, and they may also be used for rotating it, in addition to other means hereinafter specifically described for such purposes.

The outer tube 3A terminates below in a miter gear 3L, which meshes with a miter sector 3M horizontally journalled upon a cylindrical sector 3N extending down from the inner tube 3B. A swerved control arm extends from the miter gear sector 3M and terminates in a control lever 3P, which is disposed substantially in a plane passing through the axis of tubes 3A and 3B.

Vertical swinging of lever 3P rotates tubes 3A and 3B relatively to each other, a swinging of lever 3P in a horizontal plane rotates said two tubes together.

The upper end of the outer tube 3A terminates in a bisectional head 3Q which has a lateral extension 3S and a spherical formation 3R at the top. At the top 3R and next to the side from which the lateral extension 3S extends, the spherical formation 3R is sealed by a zonal sector of a spherical, transparent window 3T. Through the geometrical center of formation 3R and window 3T a flat reflector extends at a 45° incline with a horizontal axis which is directed into the lateral extension 3S. That reflector is rotatable around said axis and is indicated in the drawing by the prism 3U. A backing 3W and a strap 3X engaging the prism on the backing form an envelope 3V which fully encloses prism 3U, except the right faces thereof. In a horizontal direction the envelope 3V has a cylindrical formation 3Y, which is journalled in frame 3Z seated in the extension 3S. Upon the opposite side a trunnion 4A extends from the backing 3W in concentricity with the cylindrical formation 3Y and is journalled in a bore 4B of the head 3Q.

Upon the backing 3W a miter gear segment 4C is fixedly mounted in concentricity with the trunnion 4A and is in mesh with a miter gear segment 4D which is attached to a sector extension 4E of the inner tube 3B.

When the prism 4U is revolved by oscillating the tube 3B in relation to tube 3A the whole range of vision offered through the spherical window 3T, which is from a position below the horizontal level to a position beyond top center, may be scanned and the image received in the prism will always be projected horizontally into the extension 3S in a beam centered about the axis of trunnion 4A. By suitable reflectors such image may be transmitted down through the duct formed by the tubes 3A and 3B:

The drawing shows for that purpose a double prism 4F, which may consist of two prisms substantially like prism 3U, and a prism 4G, which are secured in the position shown in the drawing by the frame 3Z seated in extension 3S.

A picture image thus viewed and projected down through the risers or ducts 3A, 3B may be seen below on a screen or by way of a mirror arranged below the sectors 3N of the extension 3M of tube 3B. Or, in a manner corresponding with the normal arrangement of periscopes optical parts making up a telescope may be accommodated in the periscope. An object lens (not shown) may be superimposed upon prism 3U, or it may be incorporated therein, or it may underlie the prisms as shown in Fig. 33. A standard eye-piece 4H is shown to extend at right angle from the lower end of the periscope, as indicated in Fig. 27.

Such a periscope offers a panoramic view in the usual manner. But in addition, by swinging lever 3P in a plane extending through the axis of the periscope, the observer may sight at any preferred elevation, Fig. 27 indicating a position of the directive element or prism 3U, at which the sight is directed at 45° up, whereas in Fig. 28 prism 3U is directed to offer a view straight up, along the axis of the periscope. For ordinary position of a level panoramic view prism 3U is swung down through 90° from the position shown in Fig. 28. The eye-piece 4H may be mounted in the inner tube 3B, in which case it will turn with the inner tube 3B in the outer tube 3A. Or conversely, the eye-piece may be affixed to the lower end of the outer tube 3A. In the latter case the view seen will tilt through 90° around its own axis, as prism 3U swings through 90°. That may be avoided when the eye-piece is attached to the inner tube 3B, as hereinafter explained in connection with the embodiment of Figs. 30 to 32. As customary, a prism (not shown) at the far end of the eye-piece effects the optical transmission from duct 3A, 3B to eye-piece 4H.

Automatic levelling

Having described in the foregoing, by schematic details of arrangement, how gearing of this invention may be converted for directing the sight of a periscope at any desired angle, handle 3P indicating, for instance, the angle, at which the mirror or prism 3U is directed, the gearing of this invention also may be applied for keeping the sight of a periscope, or analogously a directional means on any other device, at a horizontal level or at a predetermined incline. Such an arrangement is of particular usefulness in connection with a vessel rocking upon the waves of the sea, the gearing of the instant device serving to preserve automatically the incline of view of the periscope, even though the supporting structure follows the movement of the waves. We may readily preserve a fixed angular disposition of the miter sector 3M, by connecting a gyroscope thereto, so that the mirror or prism 3U remains directed at the same angle at all times.

In the sketch of Fig. 29 this is illustrated schematically and with primitive means by a weight 4J which is rigidly attached by a connecting rod 4L to a shaft 4K extending across the cylindrical sector 3M.

The aforementioned purposes are immediately attained, if the gear sector 3M is then fixedly attached to the shaft 4K. The connecting rod 4L and the weight 4J extending from shaft 4K in a direction normal to the way the handle 3P previously extended therefrom, which direction is also normal to the center line of sight of the prism 3U, the latter sight will be level as long as the weight 4J extends plumb down.

In order, however, not to limit the observer to horizontal view, we may provide for an angular adjustment between the sector 3M and the direction in which the weight 4J depends from shaft 4K, so that the observer may direct the sight at a predetermined angle up or down, such predetermined angle being preserved by the levelling means as long as the weight 4J hangs straight down, even though the surrounding structure and the periscope itself as a whole may be swaying. Fig. 29 shows the periscope and the supporting ceiling 3 to be tilted, for instance, for about 15 degrees.

In order to offer to the observer the adjustment just mentioned, the sector 3M is not fixedly mounted upon the shaft 4K, but it is journalled upon said shaft and carries a lug 4P. In lug 4P a stud is rotatably accommodated, such stud carrying at one end the worm 4N and at the other end the knurled collar 4Q, which permits manipulation of the angular position of the worm 4N. Worm 4N meshes upon a worm wheel 4M, which is fixedly mounted upon the shaft 4K. The observer may therefore manipulate the knurled disc 4Q, thus angularly adjusting the sector 3M relatively to the wheel 4M and the rod and weight 4L, 4J, such adjustment determining the fixed angular position, at which the prism 4U remains adjusted in respect to the horizon.

It is well known to those acquainted with the optical arts, that a reversing into an up-side-down position as observed in a device of Figs. 27 to 29 can be easily overcome by the lens system of a telescope. The three other modifications shown in the drawings, those of Figs. 30 to 32, of Fig. 36 and of Figs. 33 to 35 provide arrangements in which the picture does not turn as we direct the sight up or down.

The embodiment of Figs. 30 to 32 serves to show in what simple fashion the control for universal view may be effected in a periscope by a device of this invention.

A pair of concentric tubes 5A and 5B serve as an optical duct. The outer tube 5A may be supported, so that it can be turned at will into any desired azimuth or may be raised and lowered, or both, such outer tube 5B being mounted for such purpose in a packing gland 5C arranged upon the support 5D. At the upper end of tube 5A there is a head formation 5E, which may be shaped, in analogy with the showing of Figs. 27 to 29, to close fully over the rotatable mirror or prism 5F. By way of modification, however, the rotatable upper prism 5F is shown in this instance to be capsuled in a cap 5G protecting against the entry of water or dirt, as desired, upon the duct 5A, 5B. Prism 5F is fixedly assembled with a miter gear 5H, which is journalled by a ball bearing 5J in the head formation 5E. Miter gear 5H is in mesh with the miter gear sector 5K, which is journalled by a ball bearing 5M upon a stud 5L projecting down from the head 5E.

At its upper end the inner tube 5B terminates in a sector 5N which is produced by cutting so much away from the tube as necessary for clearing the bearing and the gear parts surrounding the cylindrical extension if prism 5B is rotated through an angle corresponding to the desired range of vision. The upper end of sector 5N fits and is attached to a correspondingly reduced portion of the circumference of miter gear sector 5K, so that rotation of the inner tube 5B from below, for instance in a clockwise or counter-clockwise direction seen from above will rotate the prism 5F through corresponding angles in counterwise or clockwise direction, respectively, as viewed from the front in Fig. 30. In all these positions the view admitted by the prism 5F will be projected down through ducts 5A, 5B by the prism 5D, which is stationarily mounted on outer tube 5A by means of clamp 5Q depending from the stud 5L. The view received and transmitted by the prism 5F as indicated for alternative positions of prism 5F by the arrow 5R, will always be slightly offset from the axis of the optical duct 5A, 5B, which is however substantially negligible in all practical instances.

The inner tube 5B may be suitably journalled in tube 5A at various points of their respective extents. More particularly a ball bearing, which is not shown, may thus support the tube 5B in the tube 5A or in the flange 5S at the lower end of said tube 5A, from which flange the inner tube 5B projects down.

A handle 5T extends laterally out from flange 5S and serves for the manipulation of tube 5A. At its upper margin the flange 5S shows the graduations 5V, upon which the direction of a panoramic view may be read off at the vertical edge 5U depending thereacross from the support 5Z. A marker in the form of an arrow head is arranged below said graduation upon the flange 5S and will in turn, apprise the observer of the angle of incidence at which the periscope is directed when related to the graduations 5W applied to the upper peripheral margin of a flange 5X mounted on the inner tube 5B.

In order to render available at the lower end the view transmitted by prisms 5F and 5P down through the duct 5A, 5B, I show in the embodiment of Figs. 30 to 32, by way of modification, a prism 5Z to be superimposed upon the lower end of the inner tube 5B and to be attached thereto, so that the said view is projected to the right, at right angles with the plane which the three prisms have in common, when the prism 5F is disposed as shown in Figs. 30 and 31, i. e. when it is directed straight up. A bracket with a slightly inclined mirror 5Y at its end is mounted upon the inner tube 5B just above the lower terminal where the prism 5Z projects therefrom, mirror 5Y reflecting the view to the eye of the observer, as indicated by an arrow and the pictorial representation of an eye in Fig. 30.

But let the inner tube 5B be rotated through 90° in counterclockwise direction, seen from the top, relatively to the outer tube 5A and the prism 5F will be swung into the position in which it is shown in Fig. 32, i. e. for horizontal view. Prism 5Z and mirror 5Y having participated in such rotation, the three prisms are now in one plane with the mirror and the user may observe the view now presented by turning his head through 90° to the left from the position in which the eye is shown in Fig. 30.

An important object of this arrangement is, that the view observed by the observer is in the same upside-up position, whether the periscope be in the position of Fig. 30, or be it in the position indicated in the diagram of Fig. 32. Say, for instance, that the observer has located at the horizon an aeroplane which is flying towards hi 1 and passes overhead, then he will see that aeroplane, following it by swinging the periscope slowly from a position of Fig. 32 into that of Fig. 30, just as if he had followed its movement with his naked eye by slowly raising his head.

Hydraulic or other power means, which serve to push the periscope up and down through a packing gland, may also be converted in order to effect the panoramic rotation of the outer tube in the gland: Thus a hydraulic ram may be stationarily locked upon the outer tube of the periscope for the operation of raising and lowering the periscope. But it is also adapted for rotating the periscope by helical cam means after the lock between the parts has been released and the periscope has been rotatably suspended in a top position.

If so desired the inner tube, like the outer tube, may be telescopically extensible and collapsible.

A periscope, on which the eye piece at the lower end may be universally swung or moved if the upper sight and optical duct are arranged like that of Fig. 30, and in which the direction of vision at the upper end will always follow such swinging or movement—i. e. we may train the eye-piece and look in all directions—is shown in Fig. 36. The parts of the upper portion of a device of Fig. 30 are used. More precisely speaking the respective mechanical parts and prisms are used twice, at opposite ends of a tube 8A, which corresponds to tube 5A of Fig. 30. The upper head formation 5E extends laterally in a direction opposite to the lower head formation 5E. But the dust protecting skirt portion of the cap 5G is omitted at the upper end. There that skirt portion is, by way of modification, replaced by a housing 8B which extends fixedly and closingly from the head 5E and which is roomy enough to permit free rotation of prism 5F. That housing may have a globular and transparent zone. But the transparent section 8C thereof may on the other hand be limited—as shown, and similar to the arrangement of spherical window 3T of the device of Figs. 27 and 28—to extend only to a width and over a sector which admit the solid angle of light to be transmitted by prism 5F at and between the extreme positions, into which that prism is to be swung, and those positions will normally be only 90° or slightly more apart.

Upon the outer opening of the cap 5G of the lower prism 5F an eye-piece 8D is superimposed. It extends vertically down, so that we look straight up from the upper end of the periscope and accordingly the upper prism 5F faces up. The latter prism 5F will always be turned to face in the direction in which eye-piece 8D is turned and directed. The slight offset of the eye-piece 8D to one side and of the upper prism 5F to the opposite side of the axis of the principal outer optical conduit 8A is negligible. A projecting device, e. g. a gun or spotlight, may be mounted on top of the upper head 5E and geared to rotate with and to remain parallel to the center line of sight of the upper prism 5F.

It may be awkward for the observer to follow the eye-piece into an extreme vertical position, i. e. into the (altoscope) position of Fig. 36. But the eye-piece does not have to be swung down so far, if we use reducing gearing instead of a 1:1 transmission between the prisms 5F, or if we let the eye-piece swing 45° up and down from the horizontal in order to obtain the desired 90° movement of the sight prism 5F between the vertical and horizontal positions, or if we combine these arrangements. Thus the use of the periscope of Fig. 36 may be rendered as convenient as that of the ordinary walk-around type periscope.

On the other hand a device of Fig. 29 will be applicable in other instances where periscopes have been found useful, e. g. in surgery, in the surveillance of spaces, etc. The periscope may be erected for survey or reconnoitering so as to support itself or it may be incorporated in or camouflaged by trees, masts, towers, etc.

Only relative rotation of the outer and inner tubes, but not relative reciprocation, is used in the foregoing for directive control of the sight. Without impairing such control, the inner tube, e. g. 3B or 5B may, within the knowledge of those versed in the mechanical arts, be rendered longitudinally adjustable relatively to the outer tube (3A, 5A or 8A), for instance by being longitudinally feather keyed upon the ball bearings and the respective gears, the latter being independently journalled, if necessary. Such reciprocating movement of the inner tube may be controlled near the lower end of the periscope and converted at the upper end to shift lenses for a change of magnifying power. Or a joint rotation of the outer and inner tubes is dispensed with, i. e. the outer tube is rendered stationary, and rotation of the inner tube rotates the prisms at the upper end for panoramic view, whereas its controlled reciprocation rotates, e. g. by rack and pinion transmission, a prism 3U or 5F for inclination about a horizontal axis. For submarine use such prism movement takes place within an at least partly transparent housing sealing upon the outer tube.

In case there is to be rectification of the image, e. g. per U. S. Patent No. 784,852, it may be limited to single rectification when applied to a device of Fig. 30, although it applies to inclination in addition to declination.

It may be desirable to present views in opposite directions in connection with a periscope. An embodiment suited for such purposes is exemplified in the showing of Figs. 33 to 35 in a modification, which might for instance find use in a tank, pillbox, etc. A pair of prisms 6A and 6B are, for view in opposite directions, assembled back to back, at their reflecting surfaces, having trunnion extensions 6C and 6D, respectively, through which the light is to be transmitted therefrom. The trunnions are coaxially disposed. By them the unit 6A, 6B is revolvably accommodated in a rotatable protective superstructure which is slotted to clear the arc of view in a vertical plane.

For such purpose the drawing indicates an opening in a support 6E, upon which a turntable 6F is superimposed by way of a ball bearing 7U. At a position offset from the center of the turntable a journal 6H arises therefrom and rotatably accommodates the miter gear 6J in ball bearing 6G. The trunnion 6D of prism 6B is fixedly socketed in the miter gear 6J by way of the dust cap 6K. A slanted cover 6L is mounted on top of the turntable 6F, forms a housing in combination with the journal 6H and allocates upon the top of the turntable 6F a ball bearing 6M, from which the outer tube 6N of an optical duct extends rotatably, vertically down. Above ball bearing 6M the outer tube 6N carries the miter gear 6P. Miter gear 6P is in mesh with miter gear 6J, so that the angle or position of the prism unit 6A, 6B may be controlled by manipulation of the hand wheel 6Q, which is arranged upon the outer tube 6N below. The lower end of the outer tube 6N is shown to be journalled by a ball bearing 6R upon the inner tube 6T of the duct and it also carries at that lower end a miter gear 6S.

The other trunnion 6C of the prism unit 6A, 6B is journalled by way of a dust cap 6U in a slanted housing 6V, which forms a counter-part of the housing formed by the journal 6H and the slanted cover 6L. Slanted housing 6V is therefore mounted on top of turntable 6F and from the inside thereof a hanger 6W extends vertically down and connects by an offset extension 6X to the L-shaped bracket 6Y. In the vertical arm of L-shaped bracket 6Y a miter gear 6Z is rotatably journalled and meshes upon the miter gear 6S. Miter gear 6Z is fixedly connected by way of a capsule 7A to a shaft 7B which is journalled in the lower end of hanger 6W and carries one of the gears 7C upon its free, left end. In a manner similar to the arrangement of prism and trunnions 6B, 6D in miter gear 6J, the miter gear 6Z opens onto a prism 7D accommodated in capsule 7A. From the front side of capsule 7A extends the eye piece 7E which is in optical alignment with the prism 7D in capsule 7A, prism 7F mounted in the recess 7H of the inner tube 6T, the prism 7G which is mounted by a clamp 7J upon the inside of the slanted cover 6L, and the prism 6B.

Lenses may be suitably interposed in such a system of prisms. An object lens 7K is for instance shown to be mounted in the inner tube 6T, which is attached to and depends from the inside of the slanted cover 6L into fixed connection with a stub 7V arising from the horizontal portion of the L-shaped bracket 6Y. These parts 6T and 6Y represent, together with parts 6X and 6W, a yoke depending from the housings 6V and 6H, 6L, so that all these parts revolve together with the turntable 6F.

The prism system 6B, 7G, 7F, 7D corresponds to prism system 3U, 4F, 4G accommodated in the embodiment of Fig. 28 in the upper head of the periscope. Either one of these systems of prisms will turn the view into an upside-down position, and that may be rectified by a lens system. The four prisms in the embodiment of Figs. 27 and 28 clustering together in the head of the periscope enable a coaxial and concentric control of all movements in the said embodiment, whereas in the instant case of the embodiment of Figs. 33 to 35 the panoramic control is brought about by rotation around the axis of the turntable 6F, and the control of incidence takes place around the axis of the pair of tubes 6N, 6T. But allocating two of the prisms at the lower level of observation, permits us to convert the last prism 7D for reflection into the eye piece. Furthermore, since prism 7D swings together with capsule 7A and eye piece 7E through angles similar to those through which the prism 6B is swung, but in an opposite direction, the view seen through the eye piece 7E does not revolve with changing incidence. Furthermore the angle at which the operator turns the eye piece 7E will always be equal to the angle, at which the prism 6B is directed for view. But the latter angle is of an incidence opposite to that of the former angle of the eye piece. In other words the observer will always look to the back of himself, except when he looks straight up. In Fig. 35 the thin line 7L traces the path taken by the light in the lens system 7D, 7F, 7G, 6B.

The system of prisms 6A, 7N, 7P, 7Q permits the observer to look through the periscope in the opposite direction, i. e. to see a view which is always exposed in a direction opposite to the view seen through the prism 6B. This is traced out in a diagram of Fig. 37 by the heavy line 7M. A view to the front of the observer by prism 6A is presented to him at the prism 7Q alongside of the view he takes to the back of him through prism 6B as he sees it through the eye piece 7E. Oblique prisms 7N and 7P should have mirror coatings.

The first oblique prisms 7N is mounted by a clamp 7R upon the inside of the slanted housing 6V in optical alignment with the prism 6A. It reflects the picture received into the second oblique prism 7P which is mounted upon the extension 6X below, and from there the picture observed is passed through the capsuled prism 7Q, which may be stationary. But if prism 7Q is stationarily arranged, the picture seen therein will revolve when the transmitting prism 6A is swung through an angle in a vertical plane. Therefore prism 7Q is shown to be accommodated in a capsule 7F, and that capsule has a horizontal shaft 7T, which is journalled in hanger 6W and is connected by the chain of spur gears 7C with the miter gear 6V, so that it participates in the general movement for incidence. Thus the prism 7Q revolves through like angles with and in the same direction as prism 6A. It always presents an upside-up picture, more particularly since a Z-arrangement of the lenses 6A, 7N, 7P, 7Q does not turn a picture upside-down, as it is done by the lens systems 3U, 4F, 4G and 6B, 7G, 7F and 7D.

On the other hand, the use of an even number of mirrors or prisms prevents a reversal of the picture, i. e. a true picture and not a mirror picture is seen.

Having thus described my invention in detail, yet I do not wish to be limited thereby, except as the state of the art and the appended claims may require, for it is obvious that various modifications and changes may be made in the form of embodiment of my invention, without departing from the spirit and scope thereof.

What I claim is:

1. A device for jointly and complementarily operating a pair of control means, comprising aligned bevel gears operatively connected with said means, a covering for said gears revolvable around the axis of said gears and rotatable around an axis normal to the axis of said gears, and a gear forming part of said covering and meshed upon said bevel gears.

2. In a device of the class described, a two-part housing, one portion thereof being formed with an integral miter gear disposed within the housing, a shaft extending within said housing having a second miter gear formed thereon in mesh with the first mentioned gear, a neck member surrounding said shaft and also extending within said housing, said neck member having a third miter gear formed thereon, and disposed in meshing relationship to the first mentioned gear in diametrical opposite relation to said second gear, and a directive element connected with one portion of said housing.

3. In a device of the class described, a two-part housing, one portion thereof being formed with an integral miter gear disposed within the housing, a shaft extending within said housing having a second miter gear formed thereon in mesh with the first mentioned gear, a neck member surrounding said shaft and also extending within said housing, said neck member having a third miter gear formed thereon, and disposed in meshing relationship to the first mentioned gear in diametrical opposite relation to said second gear, a spacing element mounted on said shaft between said second and third gears having radially projecting trunnions thereon, the outer ends of said trunnions having ball-bearing contact with the inner walls of the housing parts, and a directive element connected with a portion of said housing.

4. In a device of the class described, a two-part housing of substantially spherical design, one portion thereof being formed with an integral miter gear, disposed within said housing, portions of said housing being cut away to form a slot therein, a shaft extending within said housing through the aforesaid slot, the inner end of said shaft being formed with an integral second miter gear, disposed in meshing relation to the first gear, a neck member surrounding said shaft and entering said housing through the slot therein, the upper end of said neck being also formed with an integral third miter gear disposed in meshing relation to the first gear at a point diametrically opposite the second gear, and a directive element removably secured to a portion of said housing.

5. In a device of the class described, a two-part housing of substantially spherical design, one portion thereof being formed with an integral miter gear, disposed within said housing, portions of said housing being cut away to form a slot therein, a shaft extending within said housing through the aforesaid slot, the inner end of said shaft being formed with an integral second miter gear, disposed in meshing relation to the first gear, a neck member surrounding said shaft and entering said housing through the slot therein, the upper end of said neck being also formed with an integral third miter gear disposed in meshing relation to the first gear at a point diametrically opposite the second gear, means surrounding said shaft for spacing the second and third gears and provided with radial trunnions having ball-bearing contact at their outer ends with the inner walls of the parts of said housing, and a directive element removably connected with a portion of said housing.

6. In a device of the class described, a two-part housing of substantially spherical design, the parts thereof being removably secured together, one part thereof being formed with an integral miter gear projecting inwardly within said housing, portions of said housing being cut away to form a slot therein, a shaft projecting through said slot into said housing, a neck member surrounding such shaft and also projecting within said housing, the upper ends of said shaft and neck member being each provided with an integral additional miter gear, said additional miter gears being disposed for meshing relationshp with the first mentioned gear at diametrically opposite points thereon, a spacing element for said additional miter gears surrounding an extension of the neck member, said spacing element being provided with radial trunnions having ball-bearing contact with the inner walls of the housing parts, and a directive element removably engaged with a portion of said housing.

7. A device for jointly and complementarily operating a pair of control means, comprising aligned miter gears arranged in spaced relation and connected with the respective means, a housing of substantially spherical design enclosing said gears and revolvable around the axis of the later, and an additional miter gear formed integral with the inner wall of said housing and disposed in meshing relationship to the aforesaid gears.

8. A device for jointly and complementarily operating a pair of control means comprising aligned beveled gears each connected with a companion one of said control means, said gears being rotatable about a common axis, a covering rotatable about the axis of said gears and also rotatable about an axis extending transversely of the axis of the gears, and a gear carried by said covering and extending between the beveled gears and meshing therewith and serving to turn the beveled gears in the same direction when the covering is turned about the axis of the beveled gears and also causing turning of the beveled gears in opposite directions when the covering is turned about the axis extending transversely of the first mentioned axis.

9. A control device of the character described comprising rotatable shafts fitting one about the other and adapted to be connected with separate articles to be operated, gears carried by said shafts and spaced from each other, a casing enclosing said gears and portions of the shafts carrying the gears, said casing being rotatable about an axis concentric to the shafts and about an axis transversely of said shafts and carrying a gear concentric with its second axis and extending between and meshing with the gears carried by the shafts, and means for turning said casing about its axes in predetermined directions and for selectively imparting rotation to the shafts in opposite directions or in the same direction.

10. A control device of the character described comprising rotatable shafts fitting one about the other and adapted to be connected with separate articles to be operated, gears carried by said shafts and spaced from each other, and actuating means including a casing enclosing said gears and carrying a gear extending between and meshing with the gears of the shafts, said casing being rotatable about an axis concentric with said shafts for turning said shafts in the same direction and also rotatable about an axis transversely of the shafts for rotating the shafts in opposite directions.

RUDOLF WILDERMANN.

REFERENCES CITED

The following references are of record in the file of this patent:

UNITED STATES PATENTS

| Number | Name | Date |
|---|---|---|
| 1,550,416 | Barling | Aug. 18, 1925 |
| 1,061,701 | Stumpf | May 13, 1913 |
| 1,864,329 | Vulk | June 21, 1932 |
| 539,863 | Faure | May 28, 1895 |
| 1,529,254 | Humbrecht | Mar. 10, 1925 |
| 2,173,192 | Williams | Sept. 19, 1939 |
| 2,298,267 | Alderman | Oct. 13, 1942 |
| 2,033,941 | Kryzanowsky | Mar. 17, 1936 |
| 2,038,943 | Fountain | Apr. 28, 1936 |